US012741646B2

(12) United States Patent
Desai et al.

(10) Patent No.: US 12,741,646 B2
(45) Date of Patent: Sep. 22, 2026

(54) GESTURE-BASED SYSTEMS FOR HUMAN FOLLOWING

(71) Applicant: Deere & Company, Moline, IL (US)

(72) Inventors: Dhanashree Desai, Pune (IN); Satyam Nalawade, Pune (IN)

(73) Assignee: Deere & Company, Moline, IL (US)

(*) Notice: Subject to any disclaimer, the term of this patent is extended or adjusted under 35 U.S.C. 154(b) by 35 days.

(21) Appl. No.: 18/456,019

(22) Filed: Aug. 25, 2023

(65) Prior Publication Data

US 2025/0065879 A1 Feb. 27, 2025

(51) Int. Cl.

| | |
|---|---|
| ***G06V 20/58*** | (2022.01) |
| ***B60W 30/182*** | (2020.01) |
| ***G06F 3/01*** | (2006.01) |
| ***G06T 7/20*** | (2017.01) |
| ***G06T 7/50*** | (2017.01) |

(Continued)

(52) U.S. Cl.

CPC .......... *B60W 30/182* (2013.01); *G06F 3/017* (2013.01); *G06T 7/20* (2013.01); *G06T 7/50* (2017.01); *G06T 7/70* (2017.01); *G06V 10/82* (2022.01); *G06V 20/58* (2022.01); *G06V 40/10* (2022.01); *B60W 2420/403* (2013.01); *B60W 2540/223* (2020.02); *G06T 2207/10016* (2013.01); *G06T 2207/20081* (2013.01); *G06T 2207/20084* (2013.01); *G06T 2207/30196* (2013.01)

(58) Field of Classification Search

CPC .............................. G06V 20/58; G06V 10/82

See application file for complete search history.

(56) References Cited

U.S. PATENT DOCUMENTS

| | | | |
|---|---|---|---|
| 6,313,758 | B1 | 11/2001 | Kobayashi |
| 10,621,982 | B2 | 4/2020 | Cherney et al. |

(Continued)

FOREIGN PATENT DOCUMENTS

| | | | |
|---|---|---|---|
| EP | 2898384 | B1 | 10/2019 |
| JP | 2020507160 | A | 3/2020 |

OTHER PUBLICATIONS

Extended European Search Report and Written Opinion issued in European Patent Application No. 24191649.3 dated Dec. 10, 2024, in 12 pages.

(Continued)

*Primary Examiner* — Long T Tran

(74) *Attorney, Agent, or Firm* — Young Basile Hanlon & MacFarlane, P.C.

(57) ABSTRACT

Systems and methods for gesture-based systems for human following are described. For example, a method includes detecting a human in a first image captured using an image sensor connected to a vehicle; inputting the first image to a first machine learning model to obtain a first pose of the human; comparing the first pose to pose parameters for an authentication gesture; authenticating the human based on a match to enable gesture commands from the human; inputting a second image captured using the image sensor to the first machine learning model to obtain a second pose of the human; comparing the second pose to pose parameters for a follow gesture; commencing a follow mode based on a match between the second pose and the follow gesture occurring after authentication of the human; and controlling the vehicle to follow the human responsive to being in the follow mode.

20 Claims, 16 Drawing Sheets

(51) Int. Cl.

| | |
|---|---|
| ***G06T 7/70*** | (2017.01) |
| ***G06V 10/82*** | (2022.01) |
| ***G06V 40/10*** | (2022.01) |

(56) References Cited

U.S. PATENT DOCUMENTS

| | | | | |
|---|---|---|---|---|
| 10,723,226 | B1 | 7/2020 | Heitsman et al. | |
| 2010/0066676 | A1 | 3/2010 | Kramer et al. | |
| 2011/0026770 | A1 | 2/2011 | Brookshire | |
| 2011/0242303 | A1* | 10/2011 | Giraud | E05B 81/78 340/5.72 |
| 2018/0101235 | A1 | 4/2018 | Bodensteiner et al. | |
| 2018/0336400 | A1* | 11/2018 | Aronson | G06V 20/597 |
| 2018/0360177 | A1 | 12/2018 | Kovtun et al. | |
| 2019/0171218 | A1* | 6/2019 | Hammond | G05D 1/0011 |
| 2020/0124428 | A1* | 4/2020 | Hamilton | G06Q 10/02 |
| 2020/0134330 | A1 | 4/2020 | Cherney | |
| 2021/0233255 | A1* | 7/2021 | Celestini | G06T 7/292 |
| 2021/0300423 | A1* | 9/2021 | Ahire | B60W 60/0017 |
| 2021/0304595 | A1* | 9/2021 | Ahire | H04L 9/3247 |
| 2022/0012480 | A1 | 1/2022 | Meador | |
| 2022/0266105 | A1* | 8/2022 | Roszhart | G06V 40/20 |
| 2022/0309795 | A1 | 9/2022 | Jakobsen et al. | |
| 2022/0363129 | A1* | 11/2022 | Pankov | B60K 35/10 |
| 2023/0070008 | A1* | 3/2023 | Kulon | G06T 7/194 |
| 2023/0266145 | A1* | 8/2023 | Salter | G01C 21/387 701/532 |
| 2023/0331259 | A1* | 10/2023 | Wu | B60W 60/0025 |

OTHER PUBLICATIONS

Schulte et al., Autonomous Human-Vehicle Leader-Follower Control Using Deep-Learning-Driven Gesture Recognition, Vehicles, Mar. 9, 2022, pp. 243-258, ISSN: 2624-8921, DOI: 10.3390/vehicles4010016, [online]. Retrieved from the Internet <URL: https://www.mdpi.com/2624-8921/4/1/16/pdf>.

Zdnet, A robot that follows a human commander and responds to gestures, https://www.zdnet.com/article/a-robot-that-follows-a-human-commander-and-responds-to-gestures/, Chris Jablonski, Mar. 14, 2009, 5 pages.

ScienceDirect, Hand Gesture based Concept of Human—Mobile Robot Interation with Leap Motion Sensor, https://www.sciencedirect.com/science/article/pii/S2405896319324620, S. Ahmed, V. Popov, A. Topalov, N. Shakev, Control System Department, Technical University Sofia, branch Plovdiv, Plovdiv, Bulgaria, Dec. 31, 2019, 6 pages.

* cited by examiner

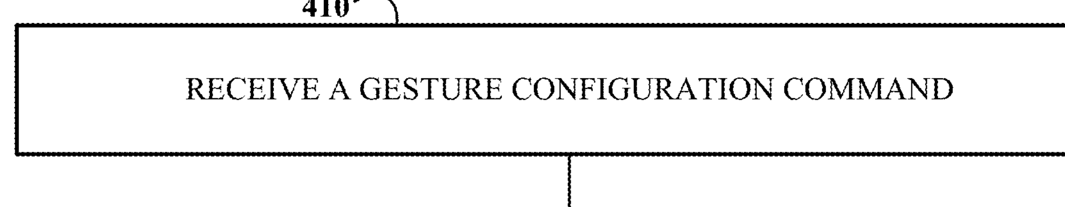

420

RESPONSIVE TO THE GESTURE CONFIGURATION COMMAND, ITERATIVELY INPUT AT LEAST PORTIONS OF A SEQUENCE OF IMAGES CATURED USING THE IMAGE SENSOR TO THE 1ST MACHINE LEARNING MODEL TO OBTAIN A SET OF POSES AND COMPARE THE POSES IN THE SET OF POSES USING A DISTANCE METRIC FOR POSES UNTIL AN AVERAGE DISTANCE BETWEEN POSES IN THE SET OF POSES IS BELOW A THRESHOLD

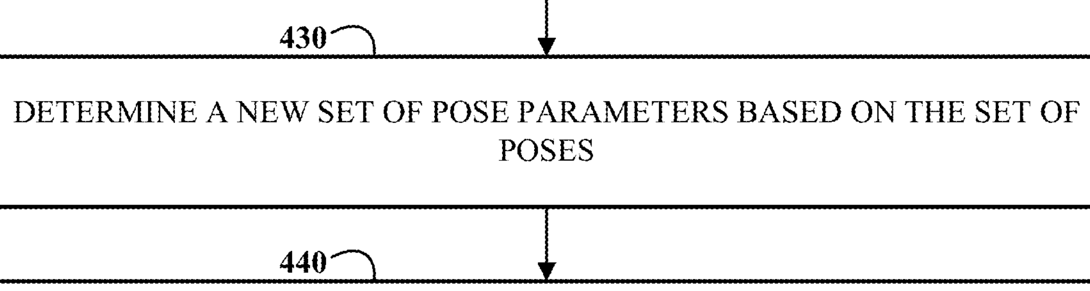

440

STORE THE NEW SET OF POSE PARAMETERS IN A GESTURE RECORD ASSOCIATED WITH A COMMAND FOR THE VEHICLE

FIG. 4

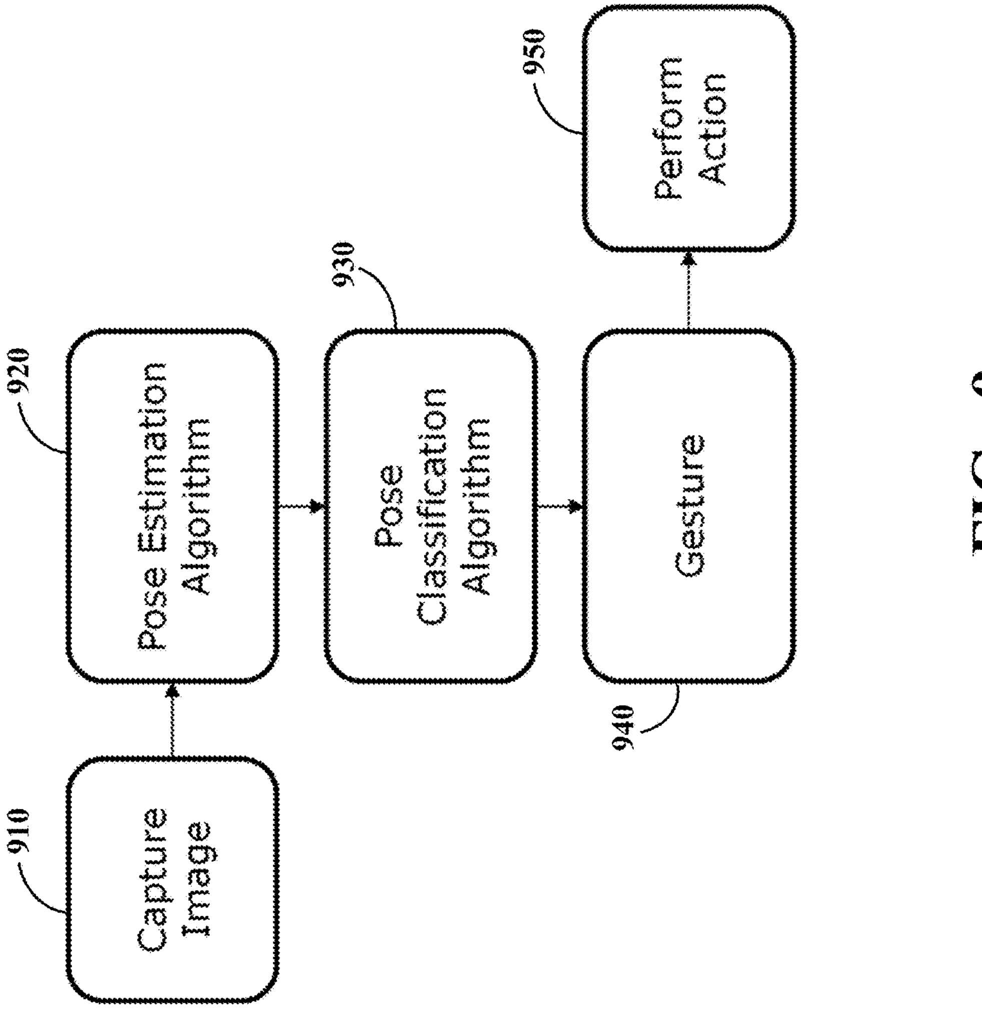
FIG. 9

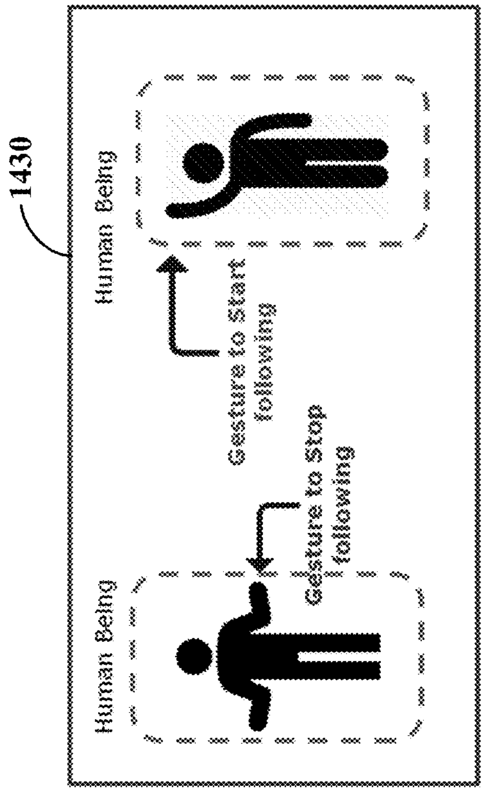
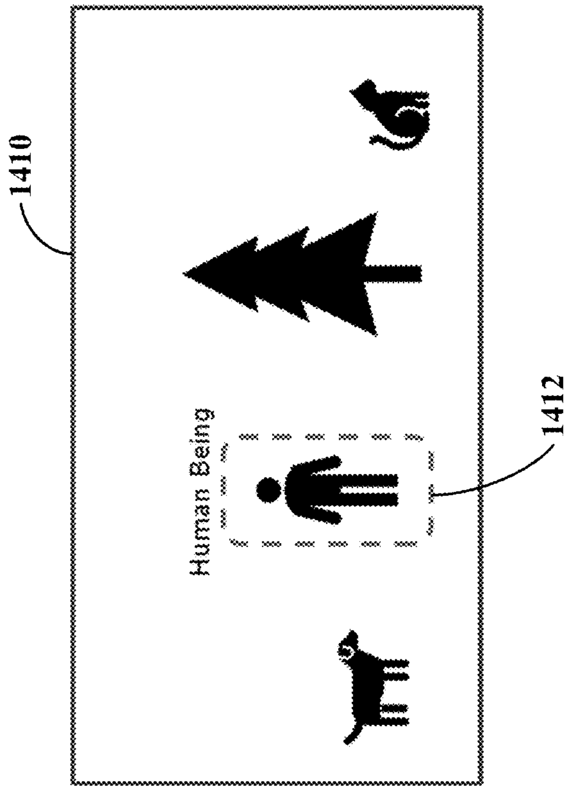
FIG. 14

GESTURE-BASED SYSTEMS FOR HUMAN FOLLOWING

TECHNICAL FIELD

This disclosure relates to gesture-based systems for human following.

BACKGROUND

Autonomous vehicles have been made for automated navigation on roads and obstacle courses. These autonomous vehicles use sensors, such as cameras and lidar, to sense objects in their environment. For example, an autonomous vehicle may generate motion plans and affect those motion plans by controlling wheels of the vehicles via control of an engine and transmission system, a braking system, and a steering system. In some cases, autonomous vehicles operate in environments with humans and need to detect presence and relative position of humans for safety.

SUMMARY

Disclosed herein are implementations of gesture-based systems for human following.

In a first aspect, the subject matter described in this specification can be embodied in methods that include detecting a human in a first image captured using an image sensor connected to a vehicle; inputting at least a portion of the first image to a first machine learning model to obtain a first pose of the human; comparing the first pose to pose parameters for an authentication gesture; authenticating the human based on a match between the first pose and the authentication gesture to enable gesture commands from the human; inputting at least a portion of a second image captured using the image sensor to the first machine learning model to obtain a second pose of the human; comparing the second pose to pose parameters for a follow gesture; commencing a follow mode based on a match between the second pose and the follow gesture occurring after authentication of the human; and controlling the vehicle to follow the human responsive to being in the follow mode.

In the first aspect, the methods may include tracking the human in video captured using the image sensor after the authentication of the human. In the first aspect, the methods may include determining a distance of the human from the vehicle based on the video captured using the image sensor during the follow mode; terminating the follow mode responsive to the distance of the human from the vehicle exceeding a threshold; and stopping the vehicle responsive to terminating the follow mode. In the first aspect, the methods may include receiving a gesture configuration command; responsive to the gesture configuration command, iteratively inputting at least portions of a sequence of images captured using the image sensor to the first machine learning model to obtain a set of poses and comparing the poses in the set of poses using a distance metric for poses until an average distance between poses in the set of poses is below a threshold; determining a new set of pose parameters based on the set of poses; and storing the new set of pose parameters in a gesture record associated with a command for the vehicle. In the first aspect, detecting the human in the first image may include inputting the first image to a deep neural network to obtain a bounding box for the human in the first image. In the first aspect, a portion of the first image specified by the bounding box may be input to the first machine learning model to obtain the first pose. In the first aspect, a portion of the first pose may be compared to the pose parameters for the authentication gesture using a distance metric for poses, wherein a pose includes positions of a set of human joints.

In a second aspect, the subject matter described in this specification can be embodied in systems that include a vehicle, an image sensor connected to the vehicle, and a processing apparatus configured to detect a human in a first image captured using the image sensor; input at least a portion of the first image to a first machine learning model to obtain a first pose of the human; compare the first pose to pose parameters for an authentication gesture; authenticate the human based on a match between the first pose and the authentication gesture to enable gesture commands from the human; input at least a portion of a second image captured using the image sensor to the first machine learning model to obtain a second pose of the human; compare the second pose to pose parameters for a follow gesture; commence a follow mode based on a match between the second pose and the follow gesture occurring after authentication of the human; and control the vehicle to follow the human responsive to being in the follow mode.

In the second aspect, the processing apparatus may be configured to track the human in video captured using the image sensor after the authentication of the human. In the second aspect, the processing apparatus may be configured to determine a distance of the human from the vehicle based on the video captured using the image sensor during the follow mode; terminate the follow mode responsive to the distance of the human from the vehicle exceeding a threshold; and stop the vehicle responsive to terminating the follow mode. In the second aspect, the processing apparatus may be configured to receive a gesture configuration command; responsive to the gesture configuration command, iteratively input at least portions of a sequence of images captured using the image sensor to the first machine learning model to obtain a set of poses and compare the poses in the set of poses using a distance metric for poses until an average distance between poses in the set of poses is below a threshold; determine a new set of pose parameters based on the set of poses; and store the new set of pose parameters in a gesture record associated with a command for the vehicle. In the second aspect, the processing apparatus may be configured to input the first image to a deep neural network to obtain a bounding box for the human in the first image. In the second aspect, a portion of the first image specified by the bounding box may be input to the first machine learning model to obtain the first pose. In the second aspect, a portion of the first pose may be compared to the pose parameters for the authentication gesture using a distance metric for poses, wherein a pose includes positions of a set of human joints. In the second aspect, the systems may include actuators configured to control motion of the vehicle; and the processing apparatus may be configured to control, using one or more of the actuators, the vehicle to follow the human. In the second aspect, the processing apparatus may be attached to the vehicle.

In a third aspect, the subject matter described in this specification can be embodied in a non-transitory computer-readable storage medium storing executable instructions that, when executed by a processor, facilitate performance of operations, including detecting a human in a first image captured using an image sensor connected to a vehicle; inputting at least a portion of the first image to a first machine learning model to obtain a first pose of the human; comparing the first pose to pose parameters for an authentication gesture; authenticating the human based on a match between the first pose and the authentication gesture to enable gesture commands from the human; inputting at least a portion of a second image captured using the image sensor to the first machine learning model to obtain a second pose of the human; comparing the second pose to pose parameters for a follow gesture; commencing a follow mode based on a match between the second pose and the follow gesture occurring after authentication of the human; and controlling the vehicle to follow the human responsive to being in the follow mode.

In the third aspect, the operations may include tracking the human in video captured using the image sensor after the authentication of the human; determining a distance of the human from the vehicle based on the video captured using the image sensor during the follow mode; terminating the follow mode responsive to the distance of the human from the vehicle exceeding a threshold; and stopping the vehicle responsive to terminating the follow mode. In the third aspect, the operations may include receiving a gesture configuration command; responsive to the gesture configuration command, iteratively inputting at least portions of a sequence of images captured using the image sensor to the first machine learning model to obtain a set of poses and comparing the poses in the set of poses using a distance metric for poses until an average distance between poses in the set of poses is below a threshold; determining a new set of pose parameters based on the set of poses; and storing the new set of pose parameters in a gesture record associated with a command for the vehicle. In the third aspect, the operations may include inputting the first image to a deep neural network to obtain a bounding box for the human in the first image, in which a portion of the first image specified by the bounding box is input to the first machine learning model to obtain the first pose.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 4 is flowchart of an example of a process for configuring a gesture for control of a vehicle.

FIG. 9 is a block diagram of an example of a system for gesture detection.

FIG. 14 shows illustrations of examples of human detection for gesture recognition.

DETAILED DESCRIPTION

Described herein are systems and processes for following a human based on gestures. A human following mode for an autonomous vehicle may be commenced when a human is first authenticated based on recognition of an authentication gesture and later the authenticated human makes another gesture as a follow command. The gestures recognized by the vehicle may be preconfigured using a gesture registration process, which may iteratively capture and assess a set of poses until an average distance between poses in the set of poses is below a threshold.

Human following by an autonomous vehicle may provide advantages in many applications, such as, marking a boundary using human following module for wire-free Consumer Autonomous Mower (CAM), which may use ultra-wideband beacons for positioning and localization. For example, in a vineyard, an autonomous grape collection trolley may be configured to follow a human in vineyard rows, which may provide an alternative to a conventional logistics model with no need for the human to carry a remote control. For example, on a manufacturing shop floor, autonomous kit-carts carrying heavy raw materials may have a capability to follow a worker with no need to manually push/pull a heavy trolley. This may enable process innovation in material movement on a factory floor. The scope of the proposed system is not limited to the applications mentioned above and can be extended to similar applications, such as, orchards, part distribution centers, and indoor applications related to dairy farms.

Figure 1:
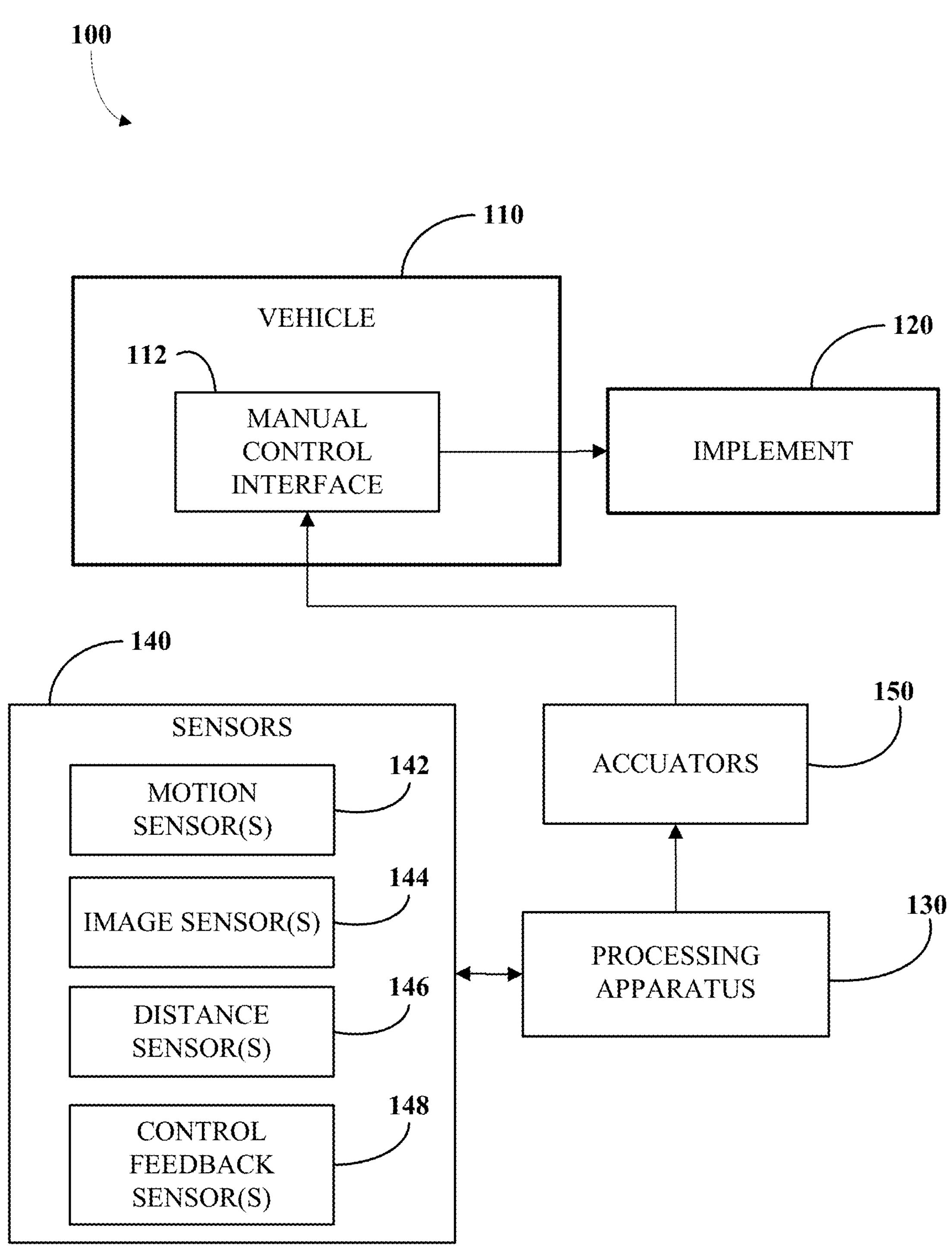
FIG. 1 is a block diagram of an example of a system for following a human based on gestures.

FIG. 1 is a block diagram of an example of a system 100 for following a human based on gestures. The system 100 system includes a vehicle 110; an implement 120 that is connected to the vehicle 110 and configured to selectively perform an operation in a vicinity of the vehicle 110; a processing apparatus 130 that is configured to control the vehicle 110 and the implement 120; sensors 140 connected to the vehicle 110 and/or the implement 120; and actuators 150 configured to control motion of the vehicle 110 and/or to control operation of the implement 120 based on control signals from the processing apparatus 130. The vehicle 110 may include a manual control interface 112 that can be used to control the vehicle 110 and the implement 120. In this example, the sensors 140 include one or more motion sensors 142, one or more image sensors 144, one or more distance sensors 146, and one or more control feedback sensors 148. The processing apparatus 130 may be configured to detect a human (e.g., an operator or an agricultural worker) in images from the one or more image sensors 144 and control the vehicle 110 to follow the human after authenticating the human based on an authentication gesture performed by the human and based on one more command gestures from the human related to following. For example, the system 100 may be used to implement the process 200 of FIG. 2. For example, the system 100 may be used to implement the process 400 of FIG. 4.

The system 100 includes a vehicle 110. For example, the vehicle 110 may be a tractor, a truck, an all-terrain vehicle, a drone, or a boat. In some implementations, the vehicle 110 is configured to move across land. For example, the vehicle 110 may include wheels, tracks, and/or treads. In some implementations, the vehicle 110 is configured to fly. For example, the vehicle 110 may include wings and/or propellers. In some implementations, the vehicle 110 is configured to move through or across the surface of water. For example, the vehicle 110 may include a propeller, an impeller, or a pump-jet. The vehicle 110 may include a manual control interface 112 that can be used to control the vehicle 110. For example, the manual control interface 112 may include a steering wheel, an accelerator pedal, and a brake pedal. In some implementations, the manual control interface 112 also controls the operation of the implement 120. For example, the manual control interface 112 may include one or more joysticks, levers, and/or buttons for controlling the implement 120.

The system 100 includes an implement 120 that is connected to the vehicle 110 and configured to selectively perform an operation in a vicinity of the vehicle 110. For example, the implement 120 may include a sprayer (e.g., a boom sprayer), a spreader, a harvester, a row crop cultivator, an auger, a plow, a tiller, a backhoe, a forklift, or a mower. The implement 120 may include a tool attached to the vehicle to perform work. For example, the implement 120 may be connected to the vehicle 110 via Power Take Off (PTO) connection. For example, the implement 120 may be connected to the vehicle 110 via permanent integration as components of a self-propelled farm implement. For example, the implement 120 may be primarily controlled via a 3-point hitch attached to the vehicle or via electronic or hydraulic systems. In some implementations, the implement 120 (e.g., controlled via a 3-point hitch) may be rigidly attached to the vehicle and can be raised and lowered to a constant height or a height that changes dynamically. For example, dynamic changes may be driven by load on the implement, such as from the ground during a tilling operation where the implement is partially in the ground or via some other sensor feedback on the implement or from the sensors 140 on the vehicle 110. For example, the implement 120 can be controlled via hydraulic or electric signaling. These signals may be used to control cutters, sprayers, motors, actuators, engines or any other required system to enable the implement 120 to execute a task. In some implementations, the implement 120, (e.g., a boom sprayer) may be actively leveled in real-time based on the tilt angle of the vehicle 110 (e.g., a tractor), which may be controlled with a closed loop system which includes sensing from the one or more motion sensors 142 (e.g., an IMU or other level sensing device) and the uses onboard actuators to level the implement 120.

The system 100 includes a processing apparatus 130. The processing apparatus 130 may include one or more processors having single or multiple processing cores. The processing apparatus 130 may include memory, such as random-access memory device (RAM), flash memory, or any other suitable type of storage device such as a non-transitory computer readable memory. The memory of the processing apparatus 130 may include executable instructions and data that can be accessed by one or more processors of the processing apparatus 130. For example, the processing apparatus 130 may include one or more DRAM modules such as double data rate synchronous dynamic random-access memory (DDR SDRAM). In some implementations, the processing apparatus 130 may include a digital signal processor (DSP). In some implementations, the processing apparatus 130 may include a graphics processing unit (GPU). In some implementations, the processing apparatus 130 may include an application specific integrated circuit (ASIC).

The system 100 includes sensors 140 configured to capture sensor data reflecting state of the vehicle 110, the implement 120, and/or an environment the vehicle 110 is in. For example, the sensors 140 may be connected to the vehicle 110 and/or the implement 120. The processing apparatus 130 may be configured to access (e.g., receive via wired or wireless communications or read from a memory) sensor data captured using the sensors 140.

The sensors 140 include one or more motion sensors 142 configured to detect motion of the vehicle 110. For example, the one or more motion sensors 142 may include one or more accelerometers, gyroscopes, magnetometers, inertial measurement units, and/or global position system (GPS) receivers. For example, motion sensor data captured using the one or more motion sensors 142 may be used to estimate a position and/or an orientation of the vehicle 110. For example, motion sensor data captured using the one or more motion sensors 142 may be used to estimate a position and/or an orientation of the implement 120. For example, the processing apparatus 130 may be configured to access (e.g., receive via wired or wireless communications or read from a memory) motion sensor data captured using the one or more motion sensors 142.

The sensors 140 include one or more image sensors 144 connected to the vehicle 110. The one or more image sensors 144 are configured to capture images (e.g., RGB images or normalized difference vegetation index images). The one or more image sensors 144 are configured to detect light of a certain spectrum (e.g., the visible spectrum or the infrared spectrum) and convey information constituting an image as electrical signals (e.g., analog or digital signals). For example, the one or more image sensors 144 may include charge-coupled devices (CCD) or active pixel sensors in complementary metal-oxide-semiconductors (CMOS). The one or more image sensors 144 may detect light incident through respective lens (e.g., a fisheye lens). In some implementations, the one or more image sensors 144 include digital-to-analog converters. In some implementations, the one or more image sensors 144 have respective fields of view that overlap. The one or more image sensors 144 may be configured to capture images of objects in a vicinity of the vehicle 110. For example, the processing apparatus 130 may be configured to receive image data, captured using the one or more image sensors 144, depicting one or more humans (e.g., agricultural workers) in a vicinity of the vehicle 110. For example, the processing apparatus 130 may be configured to receive image data, captured using the one or more image sensors 144, depicting one or more plants in a vicinity of the vehicle 110. In some implementations, the one or more images sensors 144 may be configured to capture light in bands of the spectrum corresponding to plant vitality. For example, the one or more image sensors 144 may include a normalized difference vegetation index camera.

The sensors 140 include one or more distance sensors 146 connected to the vehicle 110. For example, the one or more distance sensors may include a lidar sensor, a radar sensor, a sonar sensor, and/or a structured light sensor. For example, sensor data captured using the one or more distance sensors 146 may include a three-dimensional point cloud data reflecting the locations of objects in a vicinity of the vehicle

110. In some implementations, point cloud data captured using the one or more distance sensors 146 may be processed and encoded as a voxelized occupancy grid. In some implementations, point cloud data captured using the one or more distance sensors 146 may be processed and encoded as a voxelized occupancy grid. For example, the processing apparatus 130 may be configured to access current point cloud data captured using the one or more distance sensors 146.

The sensors 140 include one or more control feedback sensors 148. The one or more control feedback sensors 148 may sense a state of the vehicle 110 and/or the implement 120 that is being controlled by the processing apparatus 130. In some implementations, the one or more control feedback sensors 148 may provide feedback about the vehicle state for use by a control system or for system status or health monitoring. For example, the one or more control feedback sensors 148 may include a speedometer, an encoder (e.g., an optical encoder), and/or a thermometer configured to sense temperature of an engine of the vehicle 110. For example, the one or more control feedback sensors 148 may utilize vehicle Controller Area Network (CAN)-bus integration to measure vehicle speed, engine speed, fuel levels, and engine health, including but not limited to oil temperature and pressure or coolant temperatures. For example, the one or more control feedback sensors 148 may include linear and rotary position sensors, including but not limited to those employing lasers, hall effect, resistor, switches and photogates to obtain position, including but not limited to absolute and relative positioning. For example, the one or more control feedback sensors 148 may include current sensors, including but not limited to hall effect and shunt type. For example, the one or more control feedback sensors 148 may include voltage sensors, including but not limited to digital and analog sensors. For example, the one or more control feedback sensors 148 may include force sensors, including but not limited to load cells and integrally mounted strain gauges. For example, the one or more control feedback sensors 148 may include temperature sensors, including but not limited to thermocouples, thermistors and resistance temperature detectors (RTDs). For example, the one or more control feedback sensors 148 may include pressure sensors.

The system 100 includes actuators 150 configured to control motion of the vehicle 110 and/or to control operation of the implement 120. The processing apparatus 130 may be configured to control the vehicle and/or the implement 120 using the actuators 150. In some implementations, the actuators 150 include components that can be mounted and easily removed from the vehicle 110. For example, the actuators 150 may include mechanical devices that move parts of the manual control interface 112 of the vehicle 110 (e.g., turn a steering wheel, pull a pedal, pull a lever, push a joystick, and/or depress a button). For example, the actuators 150 may be connected to the vehicle 110 in a way that allows a user to manually control the vehicle 110 using the manual control interface 112, either when the processing apparatus 130 is not actively controlling the vehicle 110 or to override control from the processing apparatus 130. For example, the actuators 150 may include electric motors controlled by the processing apparatus 130. For example, the actuators 150 may include cables connecting electric motors to parts of the manual control interface 112 and configured to pull or release those parts (e.g., a steering wheel, a pedal, or lever) in response to control signals from the processing apparatus 130. In some implementations, the actuators 150 include an interface to a messaging protocol (e.g., a vehicle CAN-bus or ISObus) for controlling part of the vehicle 110 and/or the implement 120. For example, the actuators 150 may include wires that convey control signals to downstream actuators (e.g., a motor or brakes) or downstream control interfaces (e.g., a steering wheel, a lever, a button, a pedal, or a touchscreen).

In some implementations (not shown in FIG. 1), the actuators may be integrated components of the vehicle 110. For example, the actuators 150 may include a motor, a transmission system, and/or brakes of the vehicle 110.

For example, the processing apparatus 130 may be configured to detect a human in a first image captured using the image sensor 144; input at least a portion of the first image to a first machine learning model to obtain a first pose of the human; compare the first pose to pose parameters for an authentication gesture; authenticate the human based on a match between the first pose and the authentication gesture to enable gesture commands from the human; input at least a portion of a second image captured using the image sensor 144 to the first machine learning model to obtain a second pose of the human; compare the second pose to pose parameters for a follow gesture; commence a follow mode based on a match between the second pose and the follow gesture occurring after authentication of the human; and control the vehicle 110 to follow the human responsive to being in the follow mode. A pose may include positions of a set of human joints (e.g., wrist, elbow, shoulder, neck, waist, knee, ankle, and/or knuckles of the human). For example, the first machine learning model may include a deep neural network that has been trained to extract human pose data from image data. For example, the pose parameters for the authentication gesture and/or the follow gesture may have been previously determined using the process 400 of FIG. 4. In some implementations, a portion of the first pose is compared to the pose parameters for the authentication gesture using a distance metric for poses, wherein a pose includes positions of a set of human joints. For example, the distance metric for poses may be a weighted sum of distances of respective joints of the human from respective expected positions associated with the authentication gesture.

For example, the processing apparatus 130 may be configured to input the first image to a deep neural network to obtain a bounding box for the human in the first image. In some implementations, the entire first image is input to the first machine learning model. In some implementations, only a portion first image that is specified by a bounding box of the detected human is input to the first machine learning model. Inputting a portion corresponding to a bounding box for the human may serve to scale and center the image data considered by the first machine learning model to determine the first pose. For example, a portion of the first image corresponding to a bounding box for the human may be scaled and resampled to a fixed input image size for the first machine learning model.

In some implementations, the processing apparatus 130 may be configured to track the human in video captured using the image sensor 144 after the authentication of the human. After authentication, the human may continue to move around in a vicinity of the vehicle 110. Tracking the human after authentication may enable the detection of subsequent gesture commands performed by the authenticated human. For example, tracking the human in video may include inputting a current frame of the video along with a bounding box for the human from a previous frame of the video to a deep neural network to obtain an updated bounding box for the human in the current frame of video.

In this example, the system 100 includes actuators 150 configured to control motion of the vehicle 110. In some implementations, the processing apparatus 130 is configured to control, using one or more of the actuators 150, the vehicle 110 to follow the human. In some implementations, the processing apparatus 130 is attached to the vehicle 110.

In some implementations, the processing apparatus 130 is configured to determine a distance of the human from the vehicle 110 based on the video captured using the image sensor 144 during the follow mode; terminate the follow mode responsive to the distance of the human from the vehicle 110 exceeding a threshold; and stop the vehicle 110 responsive to terminating the follow mode.

For example, the processing apparatus 130 may be configured to receive a gesture configuration command; responsive to the gesture configuration command, iteratively input at least portions of a sequence of images captured using the image sensor 144 to the first machine learning model to obtain a set of poses and compare the poses in the set of poses using a distance metric for poses until an average distance between poses in the set of poses is below a threshold; determine a new set of pose parameters based on the set of poses; and store the new set of pose parameters in a gesture record associated with a command for the vehicle 110.

In some implementations, the processing apparatus 130 may be remote from the vehicle and the processing apparatus 130 is configured to receive sensor data from the sensors 140 connected to the vehicle 110 and transmit control signals to the vehicle 110 via a wireless communications network.

Figure 2:
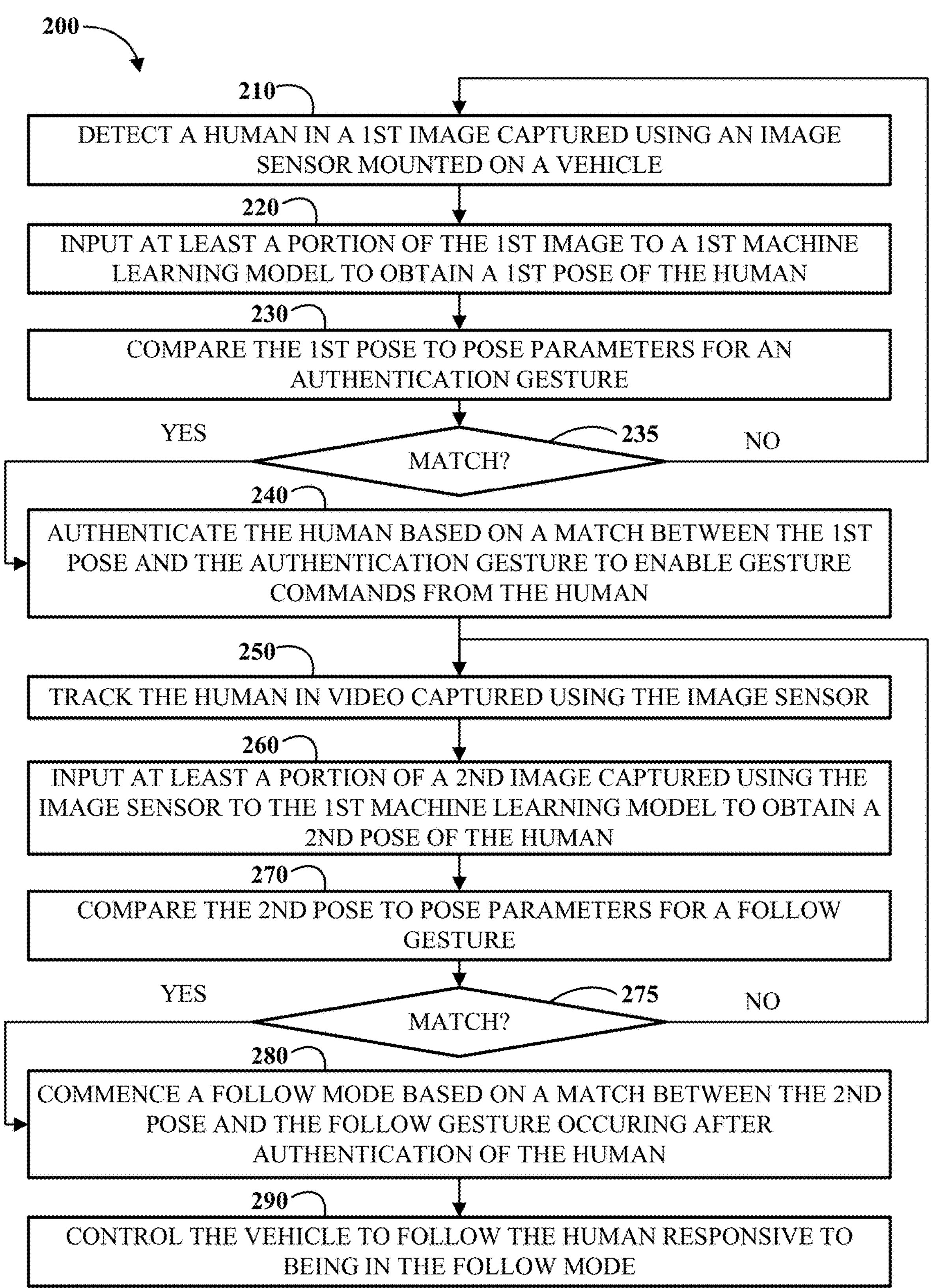
FIG. 2 is flowchart of an example of a process for following a human based on gestures.

FIG. 2 is flowchart of an example of a process 200 for following a human based on gestures. The process 200 includes detecting 210 a human in a first image captured using an image sensor connected to a vehicle; inputting 220 at least a portion of the first image to a first machine learning model to obtain a first pose of the human; comparing 230 the first pose to pose parameters for an authentication gesture; authenticating 240 the human based on a match between the first pose and the authentication gesture to enable gesture commands from the human; tracking 250 the human in video captured using the image sensor after the authentication of the human; inputting 260 at least a portion of a second image captured using the image sensor to the first machine learning model to obtain a second pose of the human; comparing 270 the second pose to pose parameters for a follow gesture; commencing 280 a follow mode based on a match between the second pose and the follow gesture occurring after authentication of the human; and controlling 290 the vehicle to follow the human responsive to being in the follow mode. For example, the process 200 may be implemented using the system 100 of FIG. 1.

The process 200 includes detecting 210 a human (e.g., an operator or an agricultural worker) in a first image captured using an image sensor connected to a vehicle (e.g., the vehicle 110). In some implementations, detecting the human in the first image may include inputting the first image to a deep neural network (e.g., with convolutional neural network layers) to obtain a bounding box for the human in the first image. The deep neural network may be trained to detect humans in images based on images captured in a typical operating environment (e.g., in an agricultural field) for the vehicle. For example, a portion of the first image specified by the bounding box is input to the first machine learning model to obtain the first pose. The resulting pose data for the human may be used to recognize gestures performed by the human.

The process 200 includes inputting 220 at least a portion of the first image to a first machine learning model to obtain a first pose of the human. The first pose may include positions of a set of human joints (e.g., wrist, elbow, shoulder, neck, waist, knee, ankle, and/or knuckles of the human). For example, the first machine learning model may include a deep neural network that has been trained to extract human pose data from image data. In some implementations, the entire first image is input 220 to the first machine learning model. In some implementations, only a portion of the first image that is specified by a bounding box of the detected 210 human is input 220 to the first machine learning model. Inputting 220 the portion specified by the bounding box may serve to scale and center the image data considered by the first machine learning model to determine the first pose. For example, the portion of the first image specified by the bounding box may be scaled and resampled to a fixed input image size for the first machine learning model.

The process 200 includes comparing 230 the first pose to pose parameters for an authentication gesture. For example, the pose parameters for the authentication gesture may have been previously determined using the process 400 of FIG. 4. In some implementations, a portion of the first pose is compared 230 to the pose parameters for the authentication gesture using a distance metric for poses, wherein a pose includes positions of a set of human joints. For example, the distance metric for poses may be a weighted sum of distances of respective joints of the human from respective expected positions associated with the authentication gesture.

At step 235, if there is no match between the first pose and the authentication gesture, then the process 200 may include continuing to attempt to detect 210 a human that may give gesture commands to the vehicle. At step 235, if there is a match between the first pose and the authentication gesture, then the process 200 includes authenticating 240 the human based on a match between the first pose and the authentication gesture to enable gesture commands from the human.

The process 200 includes tracking 250 the human in video captured using the image sensor after the authentication of the human (e.g., responsive to the authentication of the human). After authentication, the human may continue to move around in a vicinity of the vehicle. Tracking 250 the human after authentication may enable the detection of subsequent gesture commands performed by the authenticated human. For example, tracking 250 the human in the video may include inputting a current frame of the video along with a bounding box for the human from a previous frame of the video to a deep neural network to obtain and updated bounding box for the human in the current frame of the video.

The process 200 includes inputting 260 at least a portion of a second image (e.g., a frame of video) captured using the image sensor to the first machine learning model to obtain a second pose of the human. The second pose may include positions of a set of human joints (e.g., wrist, elbow, shoulder, neck, waist, knee, ankle, and/or knuckles of the human). In some implementations, the entire second image is input 260 to the first machine learning model. In some implementations, only a portion of the second image that is specified by a bounding box of the tracked 250 human is input 260 to first machine learning model. Inputting 260 the portion specified by the bounding box may serve to scale and center the image data considered by the first machine learning model to determine the second pose. For example, the portion of the second image specified by the bounding box may be scaled and resampled to a fixed input image size for the first machine learning model.

The process 200 includes comparing 270 the second pose to pose parameters for a follow gesture (e.g., the start following gesture illustrated in FIG. 14). For example, the pose parameters for the follow gesture may have been previously determined using the process 400 of FIG. 4. In some implementations, a portion of the second pose is compared 270 to the pose parameters for the follow gesture using a distance metric for poses, wherein a pose includes positions of a set of human joints. For example, the distance metric for poses may be a weighted sum of distances of respective joints of the human from respective expected positions associated with the follow gesture.

At step 275, if there is no match between the second pose and the follow gesture, then the process 200 may include continuing to track 250 the human to await a gesture command. At step 275, if there is a match between the second pose and the follow gesture, then the process 200 includes commencing 280 a follow mode based on a match between the second pose and the follow gesture occurring after authentication of the human. For example, the follow mode may continue until it is terminated using the process 300 of FIG. 3.

Figure 16:
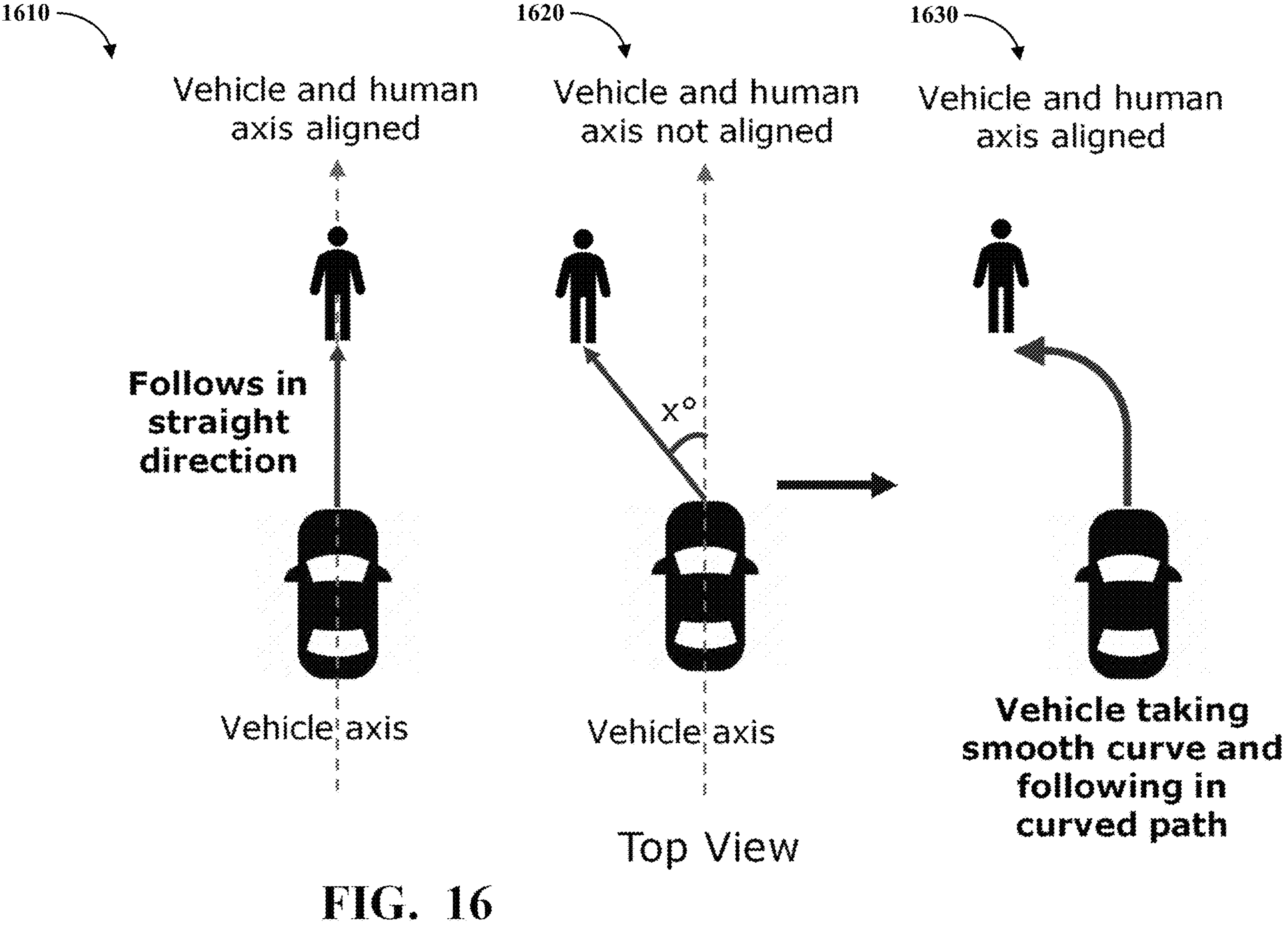
FIG. 16 shows illustrations of examples of control of a vehicle for automated human following.

The process 200 includes controlling 290 the vehicle (e.g., the vehicle 110) to follow the human responsive to being in the follow mode. For example, controlling 290 the vehicle may include activating actuators (e.g., the actuators 150) to turn a steering wheel and depress an accelerator or a brake pedal or to otherwise cause the vehicle to move in coordination with the human and maintain a preferred distance from the human. For example, controlling 290 the vehicle may include transmitting wireless control signals to a receiver mounted on the vehicle to cause the vehicle to move synchronously with the human being followed. In some implementations, controlling 290 the vehicle to follow the human includes planning and executing smooth curve turns with the vehicle to realign the motion of the vehicle with motion of the human. For example, smooth curve turns may be executed as illustrated in FIG. 16. In some implementations, controlling 290 the vehicle to follow the human includes detecting and maneuvering the vehicle around obstacles (e.g., a plant, a crop bed, a building or a piece of equipment) occurring in a path to the human's position.

Figure 3:
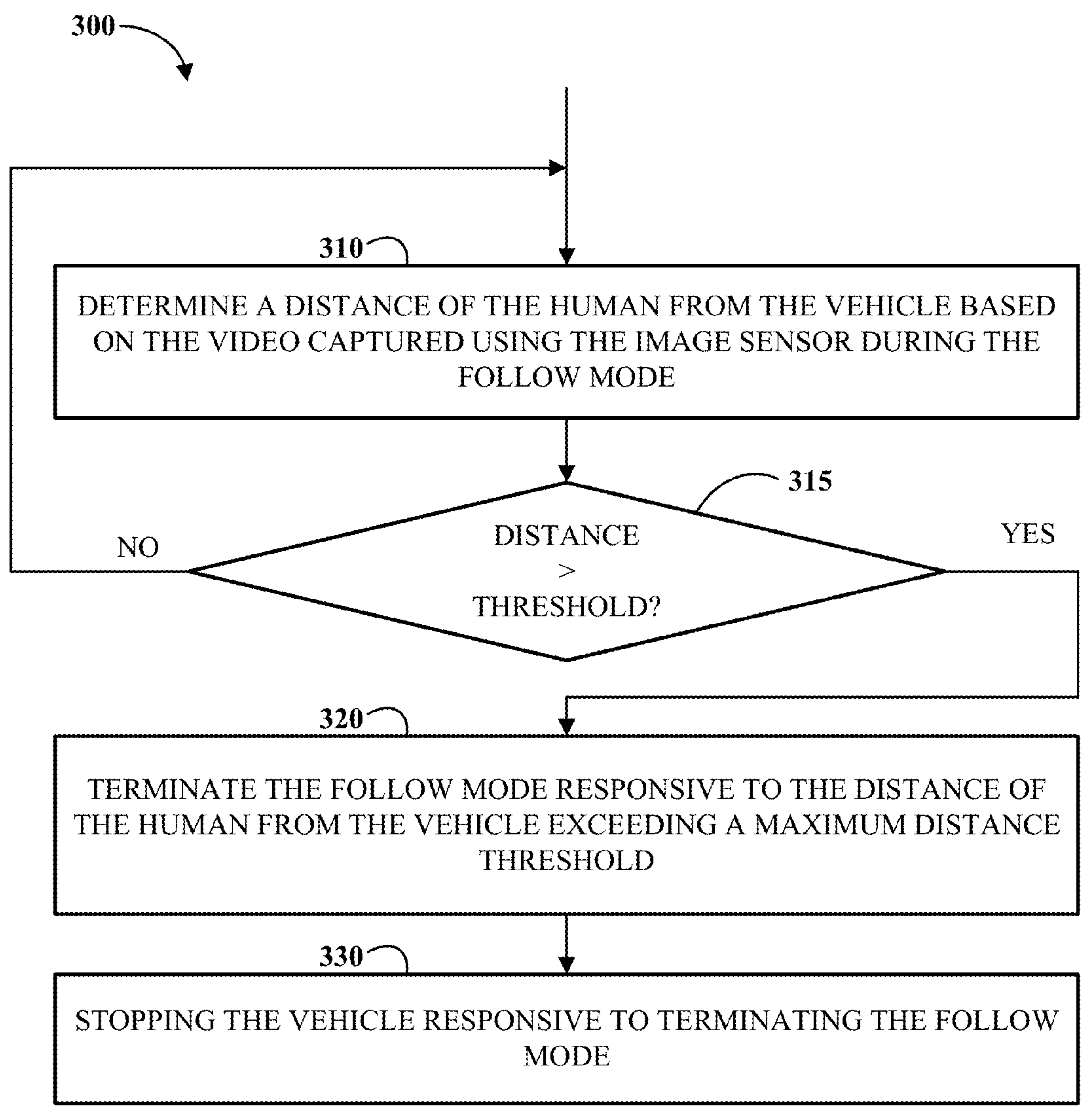
FIG. 3 is flowchart of an example of a process for discontinuing following of a human.

FIG. 3 is flowchart of an example of a process 300 for discontinuing following of a human. The process 300 includes determining 310 a distance of the human from the vehicle based on the video captured using the image sensor during the follow mode; terminating 320 the follow mode responsive to the distance of the human from the vehicle exceeding a threshold; and stopping 330 the vehicle responsive to terminating the follow mode. For example, the process 300 may be implemented using the system 100 of FIG. 1.

The process 300 includes determining 310 a distance of the human from the vehicle based on the video captured using the image sensor during the follow mode. For example, the video may be captured using multiple image sensors connected to the vehicle (e.g., an array of image sensors in the one or more image sensors 144), and stereoscopic vision techniques may be applied to determine 310 the distance of the human from the vehicle. In some implementations, the distance may be determined 310 based on a preconfigured or assumed height of the human in comparison to an apparent height of the human appearing in a frame of video (e.g., an apparent height measured in a number of pixels in the height of a bounding box for the human).

At step 315, if the distance is below a threshold, then the process 300 may include continuing to determine 310 the distance of the human from the vehicle based on subsequent frames of the video. At step 315, if the distance exceeds the threshold, then the process 300 includes terminating 320 the follow mode responsive to the distance of the human from the vehicle exceeding a threshold (e.g., a maximum distance threshold) and stopping 330 the vehicle responsive to terminating the follow mode.

FIG. 4 is flowchart of an example of a process 400 for configuring a gesture for control of a vehicle. The process 400 includes receiving 410 a gesture configuration command; responsive to the gesture configuration command, iteratively inputting 420 at least portions of a sequence of images captured using the image sensor to the first machine learning model to obtain a set of poses and comparing the poses in the set of poses using a distance metric for poses until an average distance between poses in the set of poses is below a threshold; determining 430 a new set of pose parameters based on the set of poses; and storing 440 the new set of pose parameters in a gesture record associated with a command for the vehicle. For example, the process 400 may be implemented using the system 100 of FIG. 1. For example, the process 400 may be implemented using the system 1000 of FIG. 10.

The process 400 includes receiving 410 a gesture configuration command. The configuration command may be received 410 via a user interface for the vehicle that a user has authenticated to access (e.g., by inputting a username and password and/or biometric data). For example, the gesture configuration command may be received 410 via the onboard display 820 or the personal computing device 822 of FIG. 8A. The user may issue the gesture configuration command when they are in the vicinity of the vehicle and prepared to demonstrate a new gesture in front of an image sensor of the vehicle. The new gesture can be associated with the user and/or with a command.

The process 400 includes, responsive to the gesture configuration command, iteratively inputting 420 at least portions of a sequence of images captured using the image sensor to the first machine learning model to obtain a set of poses and comparing the poses in the set of poses using a distance metric for poses until an average distance between poses in the set of poses is below a threshold. For example, the process 500 of FIG. 5 may be implemented to iteratively input 420 at least portions of a sequence of images captured using the image sensor to the first machine learning model to obtain the set of poses.

The process 400 includes determining 430 a new set of pose parameters based on the set of poses. In some implementations, the new set of pose parameters may be determined 430 by determining statistics of the set of poses (e.g., a final set of poses after the iterative process of collecting pose data completes). For example, the new set of pose parameters may be determined 430 by averaging the set of poses. For example, the new set of pose parameters may be determined 430 by ranges of joint positions in the set of poses.

The process 400 includes storing 440 the new set of pose parameters in a gesture record associated with a command for the vehicle. For example, the new set of pose parameters may be stored in a record of the gesture database of the system 1310 of FIG. 13. For example, the new set of pose parameters may be associated with a command. For example, the new set of pose parameters may be associated with a command. For example, the new set of pose parameters may be used to specify an authentication gesture for humans.

Figure 5:
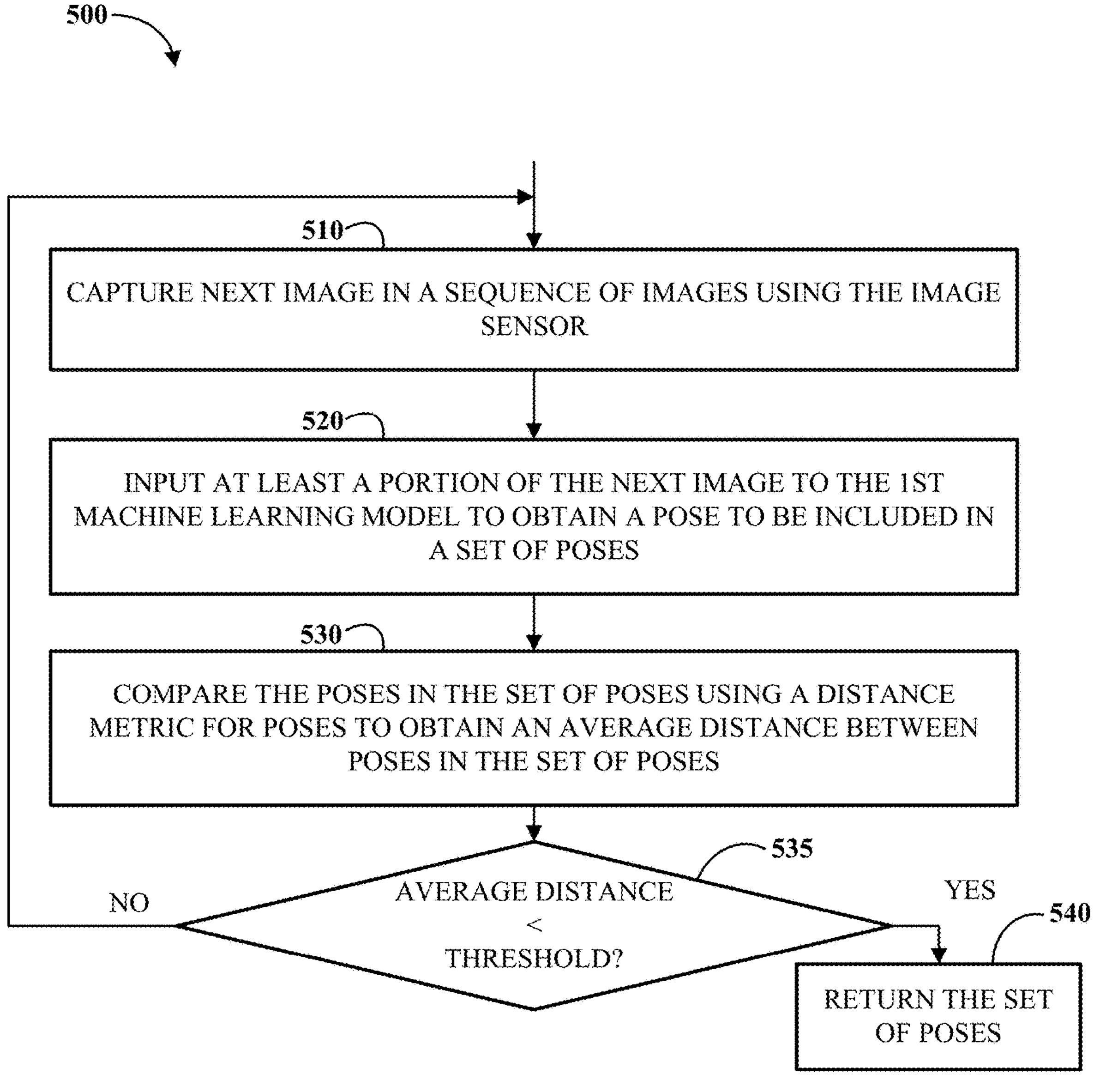
FIG. 5 is flowchart of an example of a process for iteratively processing images to determine a set of poses associated with a new gesture.

FIG. 5 is flowchart of an example of a process 500 for iteratively processing images to determine a set of poses associated with a new gesture. The process 500 includes capturing 510 a next image in a sequence of images using the image sensor; inputting 520 at least a portion of the next image to the first machine learning model to obtain a pose to be included in a set of poses; comparing 530 the poses in the set of poses using a distance metric for poses to obtain an average distance between poses in set of poses; and returning 540 the set of poses when the average distance is below a threshold. For example, the process 400 may be implemented using the system 100 of FIG. 1. For example, the process 400 may be implemented using the system 1000 of FIG. 10.

The process 500 includes capturing 510 a next image in a sequence of images (e.g., frames of a video) using the image sensor (e.g., the one or more image sensors 144).

The process 500 includes inputting 520 at least a portion of the next image to the first machine learning model to obtain a pose to be included in a set of poses. The poses in the set of poses may each include positions of a set of human joints (e.g., wrist, elbow, shoulder, neck, waist, knee, ankle, and/or knuckles of the human). For example, the first machine learning model may include a deep neural network that has been trained to extract human pose data from image data. In some implementations, the entire current image is input 520 to the first machine learning model. In some implementations, only a portion of the current image that is specified by a bounding box of the detected human is input 520 to the first machine learning model. Inputting 520 the portion specified by the bounding box may serve to scale and center the image data considered by the first machine learning model to determine a current pose. For example, the portion of the first image specified by the bounding box may be scaled and resampled to a fixed input image size for the first machine learning model.

The process 500 includes comparing 530 the poses in the set of poses using a distance metric for poses to obtain an average distance between the poses in the set of poses. In some implementations, a portion of a pose in the set of poses is compared 530 to a corresponding portion of another pose in the set of poses using a distance metric for poses. For example, the distance metric for poses may be a weighted sum of distances of respective joints of the human between the pair of poses from the set of poses. The pairwise distances for the poses in the set of poses may be averaged to determine the average distance between poses in set of poses.

At step 535, if the average distance is above a threshold, then the process 500 may include continuing to capture 510 the next image in the sequence of images. At step 535, if the distance exceeds the threshold, then the process 500 includes returning 540 the set of poses, which may be used to determine the new pose parameters to so specify a new gesture to be associated with a command or another function, such as authentication.

Figure 6:
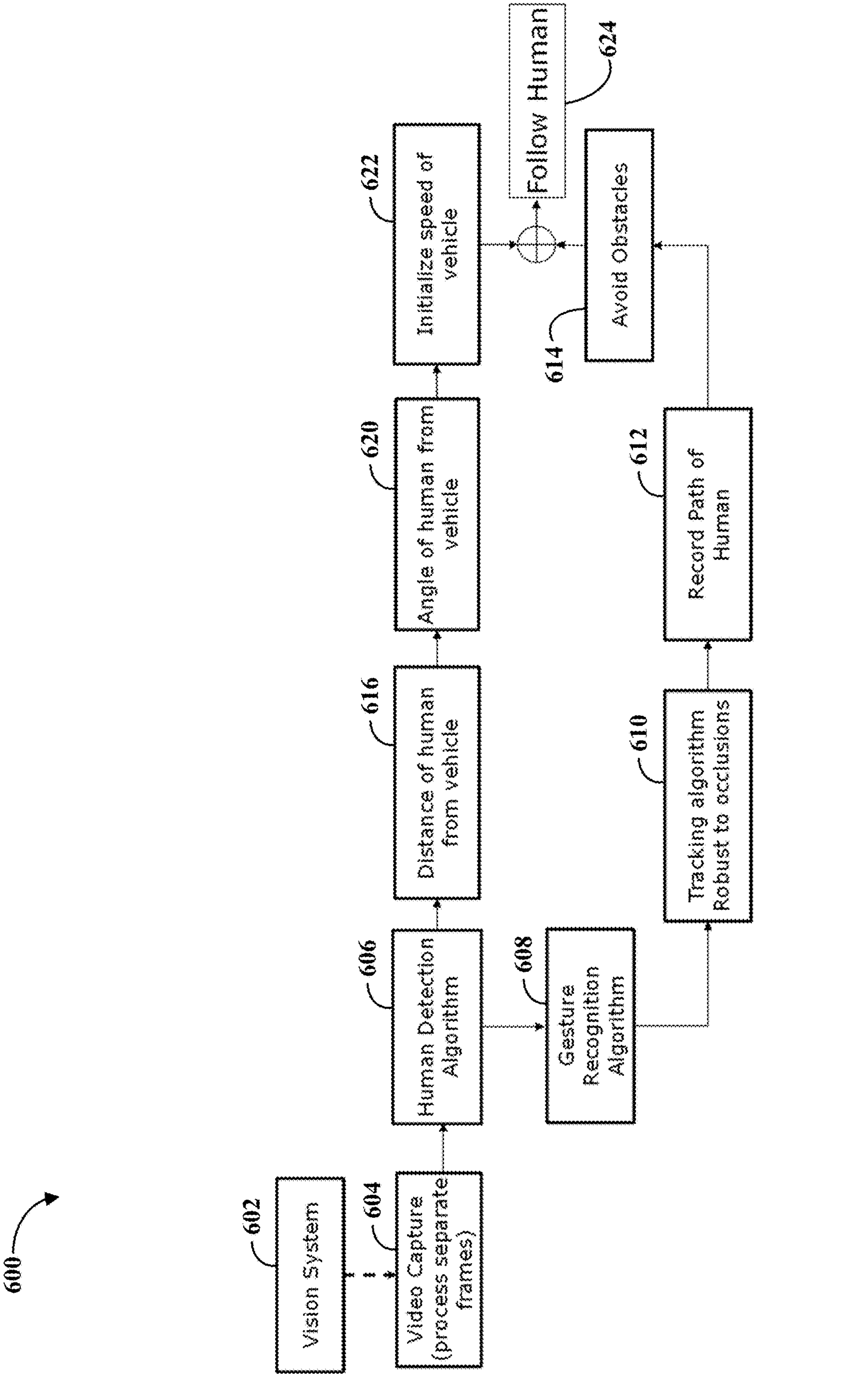
FIG. 6 is a block diagram of an example of a system for following a human based on gestures.

FIG. 6 is a block diagram of an example of a system 600 for following a human based on gestures. The system 600 includes a vision system 602, a video capture module 604; a human detection algorithm 606; a gesture recognition algorithm 608; a tracking algorithm 610 that is robust to occlusions; a recorder module 612 configured to record a path of a human; an obstacle avoidance module 614 configured to detect and navigate around obstacles; a distance estimation algorithm 616 configured to determine a distance between a vehicle and a human the vehicle is following; an angle estimation algorithm 620 configured to determine an angle between a vehicle heading and a human the vehicle is following; speed controller 622 configured to initialize a speed of speed of the vehicle; and a human following controller 624 configured to plan a motion of the vehicle to follow a human while avoiding obstacles. For example, the system 600 may be used to implement the process 200 of FIG. 2.

Figure 7:
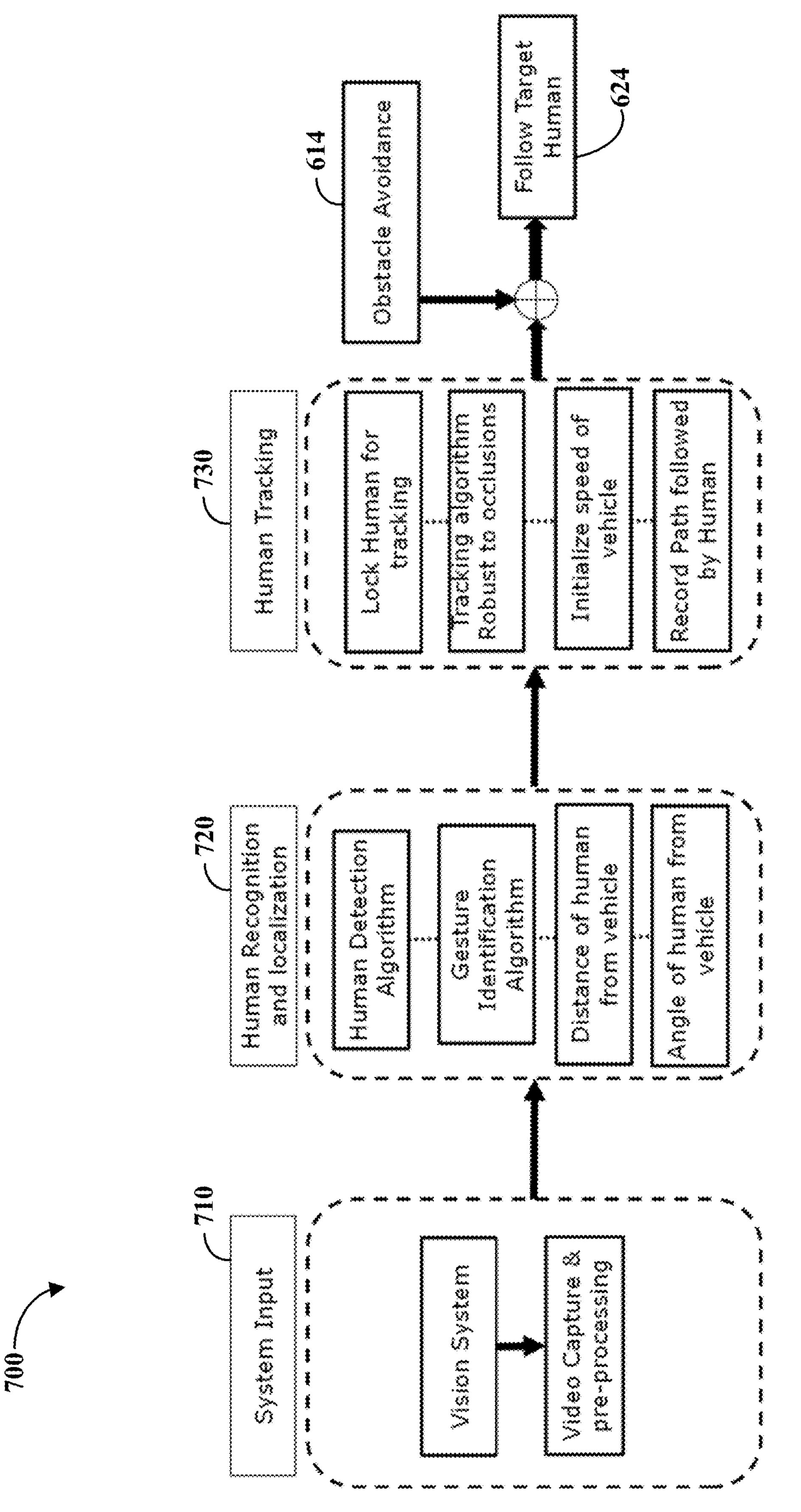
FIG. 7 is a block diagram of an example of a system for following a human based on gestures.

FIG. 7 is a block diagram of an example of a system 700 for following a human based on gestures. The system 700 includes a system input module 710 configured to gather sensor data about an environment around a vehicle, including video data captured using one or more image sensors attached to the vehicle. The system 700 includes a human recognition and localization module 720 configured to detect a human in a vicinity of the vehicle, recognize gestures made by the human, and determine a position of the human relative to the vehicle as a distance and an angle from a heading of the vehicle. The system 700 includes a human tracking module 730 configured to lock onto a human who has been authenticated, track the human's position as the position changes relative to the vehicle, select a direction and speed for the vehicle to follow the human, and record a path traversed by the human. The system 700 includes the obstacle avoidance module 614 and the human following controller 624. For example, the system 700 may be used to implement the process 200 of FIG. 2.

Figures 8A, 8B:
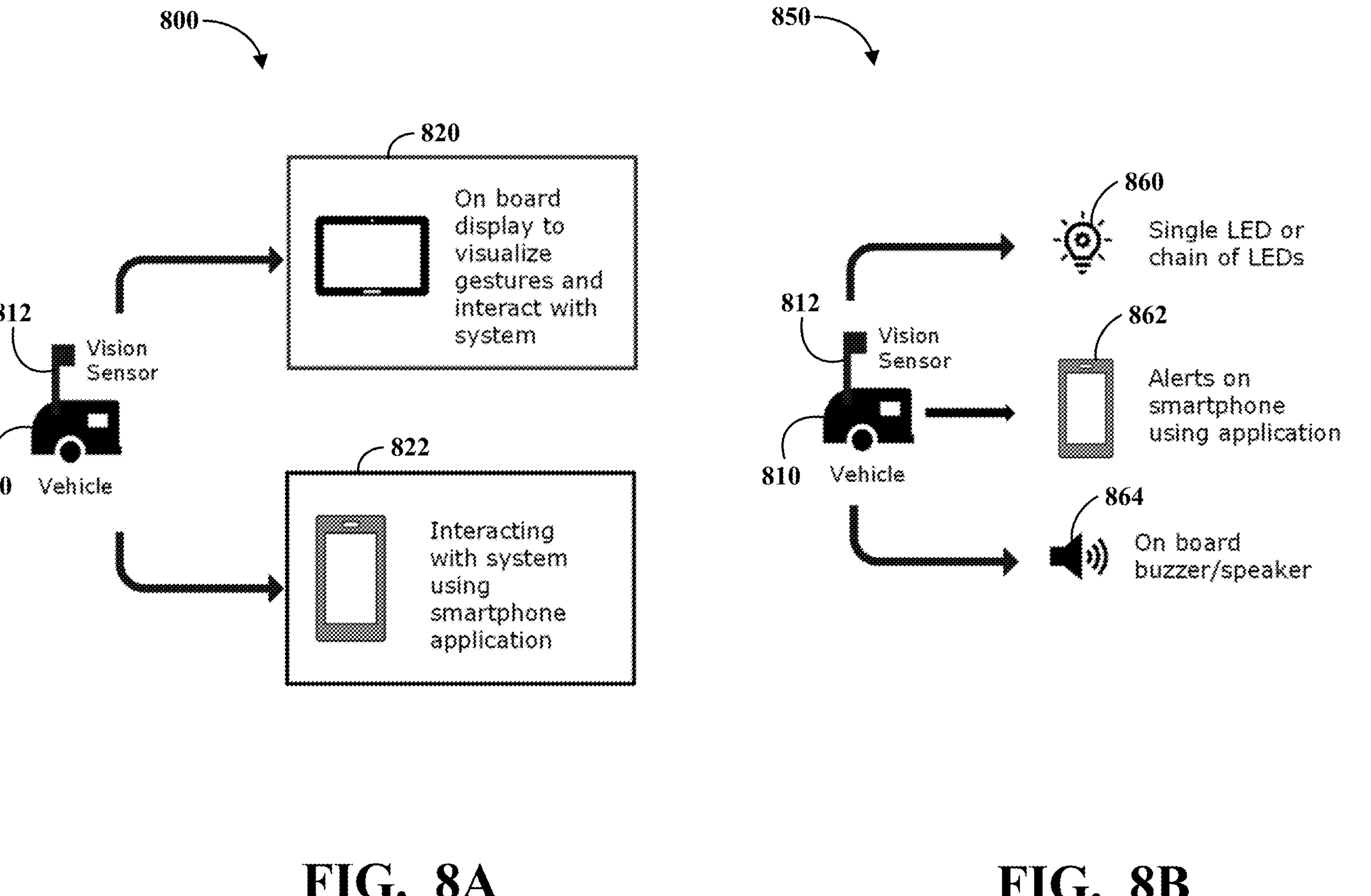
FIGS. 8A-8B are illustrations of examples of interfaces for human interaction with a vehicle.

FIGS. 8A-8B are illustrations of examples of interfaces for human interaction with a vehicle. FIG. 8A depicts a system 800 including a vehicle 810 with an attached vision sensor 812. The system 800 includes two interfaces for human interaction. The first interface is an onboard display 820 (e.g., a touchscreen display), which may be used to visualize gestures and interact with the system. The second interface is a wireless communications interface that enables a user to interact with the system using a personal computing device 822, such as a smartphone or a tablet running an application for communication with the vehicle 810.

FIG. 8B depicts a system 850 including the vehicle 810 with the attached vision sensor 812. The system 850 includes three interfaces for providing feedback or indications for human interaction. The first interface is one or more light emitting diodes 860 (LEDs), which may be used to indicate a current state of the system 850 (e.g., recording for gesture registration or registration complete). The second interface is a wireless communications interface that enables a user to receive alert messages from the system using a personal computing device 862, such as a smartphone or a tablet running an application for communication with the vehicle 810. The third interface is one or more onboard speakers 864, which may be used to indicate a current state of the system 850 (e.g., starting recording for gesture registration or registration complete). For example, the interfaces for human interaction shown in FIGS. 8A-8B may be used to implement the process 400 of FIG. 4.

FIG. 9 is a block diagram of an example of a system 900 for gesture detection. The system 900 includes an image capture module 910; a pose estimation algorithm 920; a pose classification algorithm 930; a gesture mapping database 940; and one more actuators 950 configured to perform an action corresponding to a recognized gesture. For example, the system 900 may be used to implement the process 200 of FIG. 2.

Figure 10:
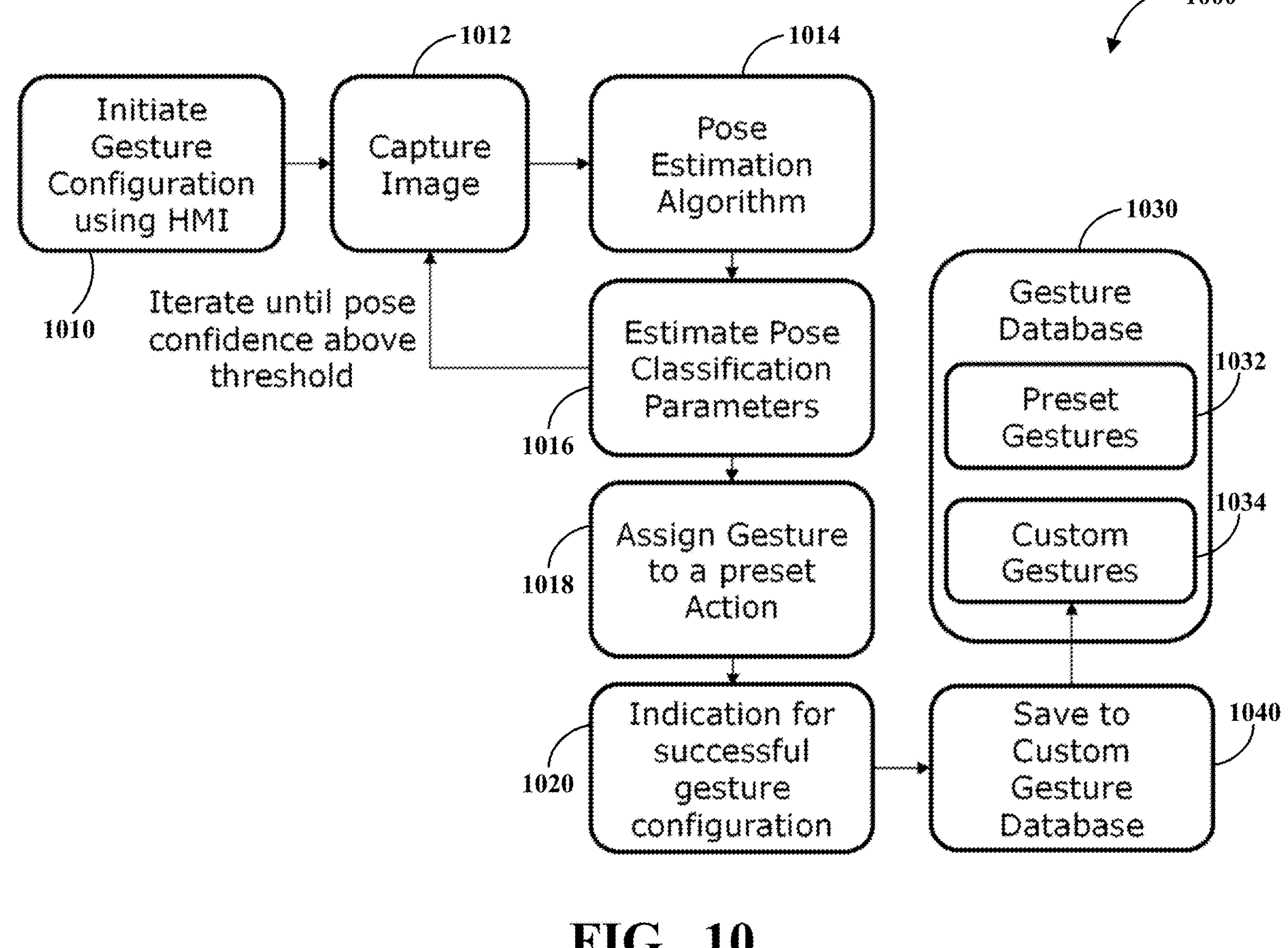
FIG. 10 is a block diagram of an example of a system for gesture configuration.

FIG. 10 is a block diagram of an example of a system 1000 for gesture configuration. The system 1000 includes a gesture configuration mode initiation module 1010, which may receive a signal (e.g., via the onboard display 820 or the personal computing device 822) and initiate a gesture configuration mode based on the received signal. The system 1000 includes an image capture module 1012, configured to capture images (e.g., frames of video) of a human user who has initiated a gesture configuration mode. The image capture module 1012 may include one more image sensors attached to a vehicle. The system 1000 includes a pose estimation algorithm 1014 configured to determine a pose of the human based on an image from the image capture module 1012 and add the pose to a set of poses for a new gesture. For example, the pose estimation algorithm 1014 may be configured to input at least a portion of the first image to a first machine learning model to obtain a pose of the human. The system 1000 includes a pose aggregation algorithm 1016 configured to estimate pose parameters for a new gesture based on the set of poses.

The system 1000 may be configured to iteratively input at least portions of a sequence of images captured using the image capture module 1012 to the first machine learning model to obtain a set of poses and compare the poses in the set of poses using a distance metric for poses until an average distance between poses in the set of poses is below a threshold. When the average distance is below the threshold, the pose aggregation algorithm 1016 may be configured to determine a new set of pose parameters based on the set of poses. The system 1000 includes a gesture assignment module 1018 configured to assign a new gesture specified by the new set of pose parameters to a command (e.g., start following, stop following, start recording path, stop recording path, increase speed, or decrease speed). The command may cause a preset action to be performed by the vehicle when it is performed by an authenticated user. For example, the gesture assignment module 1018 may assign the gesture based on an action selection message received via a human machine interface (e.g., via the onboard display 820 or the personal computing device 822). The system 1000 includes a feedback module 1020 configured to provide an indication to the user that a new gesture has been successfully configured and assigned to an action/command for the vehicle. For example, the feedback module 1020 may provide the indication of successful gesture registration via a feedback channel (e.g., the one or more light emitting diodes 860, the personal computing device 862, and/or the one or more onboard speakers 864).

The system 1000 includes a gesture database 1030 configured to store records associated with respective gestures and their respective actions or commands. The gesture database 1030 may store records associated with preset gestures 1032 and records associated with custom gestures 1034. For example, a preset gesture may be specified prior deployment of the system 1000 in the field by a developer, rather than by a particular user of the system 1000. The system 1000 includes a gesture assignment module 1040 configured to store the new set of pose parameters in a gesture record (e.g., as a new custom gesture in the custom gestures 1034) associated with a command for the vehicle. In an example, an authentication gesture for the user is configured using the system 1000 and its pose parameters are stores in a record of the gesture database 1030. For example, the system 1000 may be used to implement the process 400 of FIG. 4. For example, the system 1000 may be used to implement the process 500 of FIG. 5.

Figure 11:
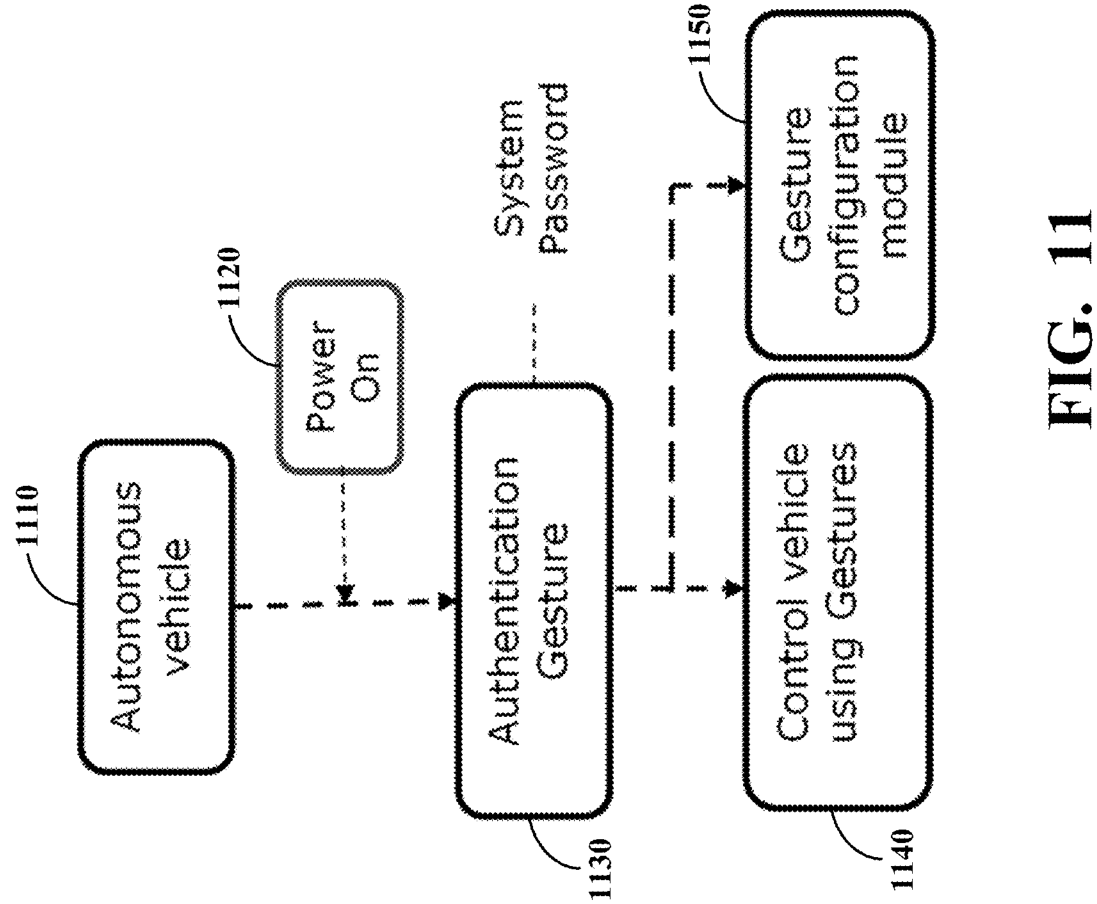
FIG. 11 is a block diagram of an example of a system for user authentication.

FIG. 11 is a block diagram of an example of a pipeline 1100 for user authentication. The pipeline 1100 includes an autonomous vehicle 1110. After a power on signal 1120, an authentication gesture 1130 is detected, which may serve as a system password for the autonomous vehicle 1110. After the authentication gesture 1130 is detected, a user who performed may then control 1140 the autonomous vehicle 1110 using gestures and/or activate a gesture configuration module 1150. For example, the gesture configuration module 1150 may implement the process 400 of FIG. 4.

Figures 12A, 12B:
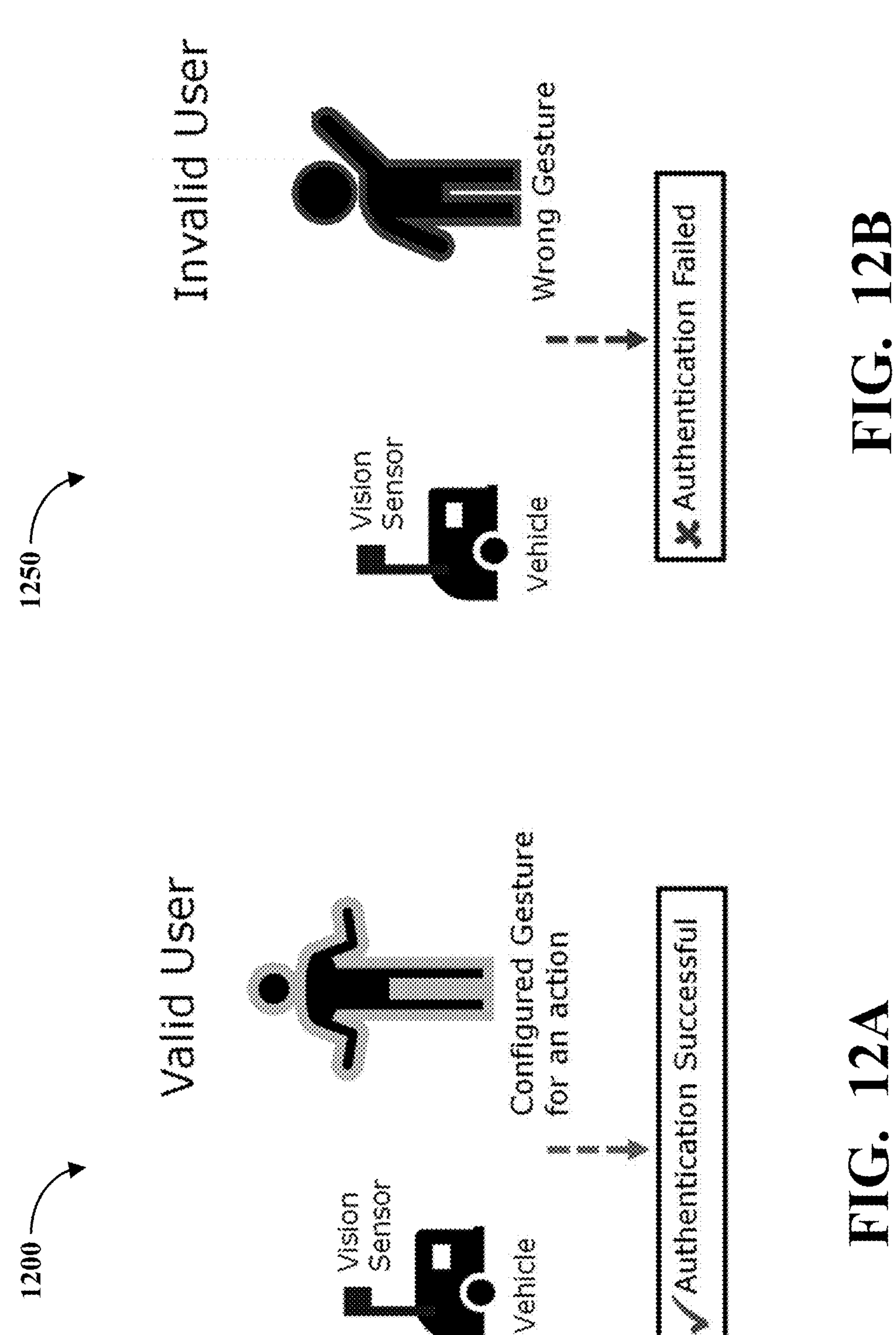
FIGS. 12A-12B are illustrations of examples of the use of gestures for authentication.

FIGS. 12A-12B are illustrations of examples of the use of gestures for authentication. FIG. 12A depicts a user correctly performing an authentication gesture 1200, resulting in a successful authentication of the user as a valid user of a vehicle. FIG. 12B depicts a user performing a wrong gesture 1250, resulting in a failed to authentication of the user and the user continuing to be classified as an invalid user of a vehicle.

Figure 13:
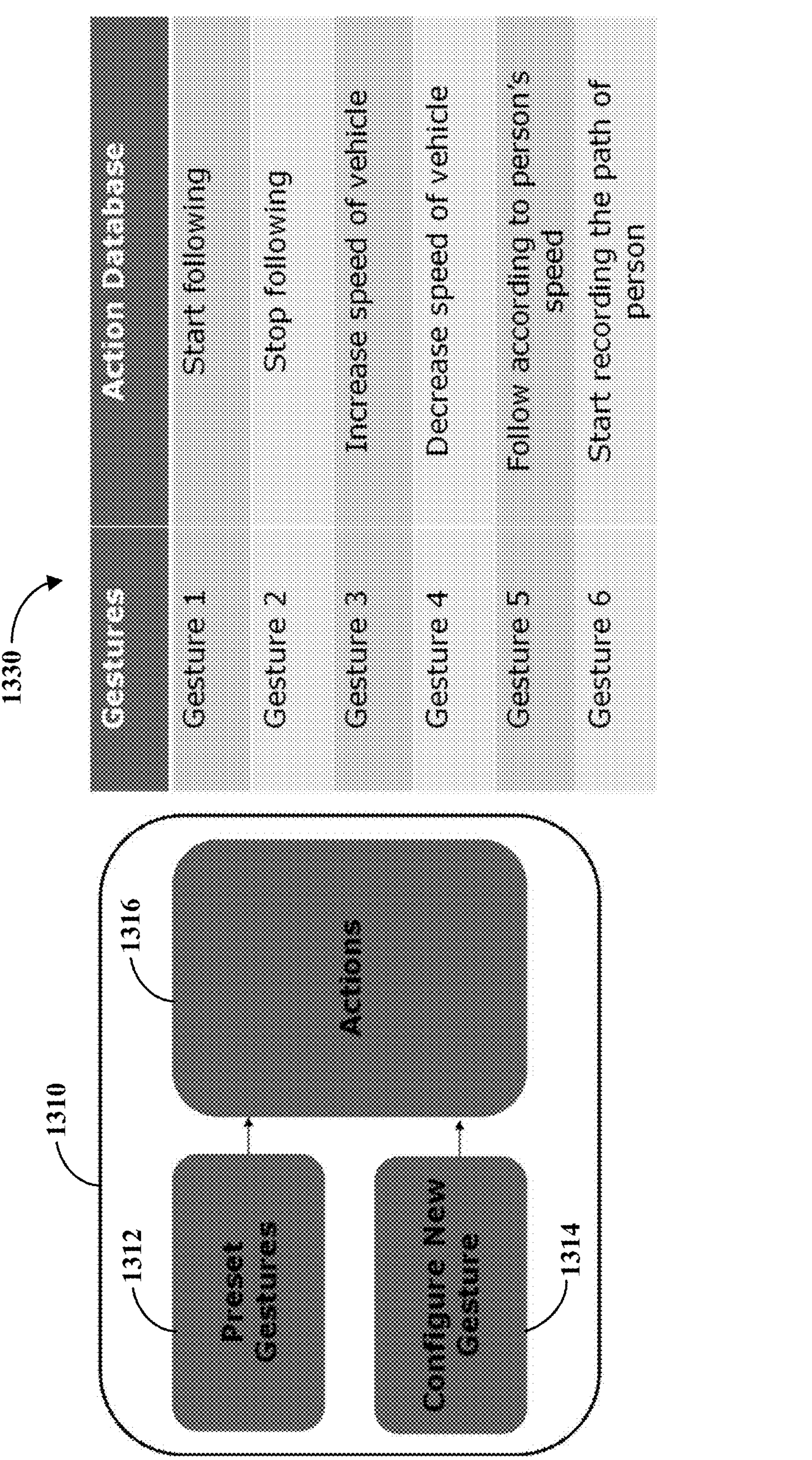
FIG. 13 is an illustration of an example of a system for configurable gesture-based control.

FIG. 13 is an illustration of an example of a system 1310 configurable for gesture-based control. The system 1310 is configured to perform a set of actions 1316 (e.g., start following, stop following, start recording path, stop recording path, increase speed, and decrease speed). The system 1310 is configured to recognize a set of preset gestures 1312, which can be the preset gestures 1032, and a set of custom configured gestures 1314 that have been registered by a user of the system 1310, and which can be the custom gestures 1034. In some implementations, a custom gesture in the set of custom configured gestures 1314 may be used to override a preset gesture from the set of preset gestures 1312. Table 1330 depicts the associations of gestures recognized by the system 1310 with respective actions from the set of actions 1316. The gestures and corresponding actions represented in the table 1330 are for illustration only and can be extended further to accommodate application specific actions. When the system 1310 detects one of its recognized gestures, it may respond by performing the respective action associated with the recognized gesture.

FIG. 14 shows illustrations of examples of human detection for gesture recognition. A first image 1410, captured by an image sensor attached to a vehicle, depicts a dog, a human, a tree, and a cat, where the human has been detected and a bounding box 1412 is drawn around a set of pixels associated with the detected human. The pixels in the bounding box 1412 may then be rescaled and input to machine learning model that has been trained to determine a pose for the human. A second image 1430, captured by an image sensor attached to a vehicle, illustrates gesture recognition for two detected humans. The second image 1430 depicts a first human performing a gesture corresponding to a command for a vehicle to stop following the first human and a second human performing a gesture corresponding to a command for the vehicle to start following the second human.

Figure 15:
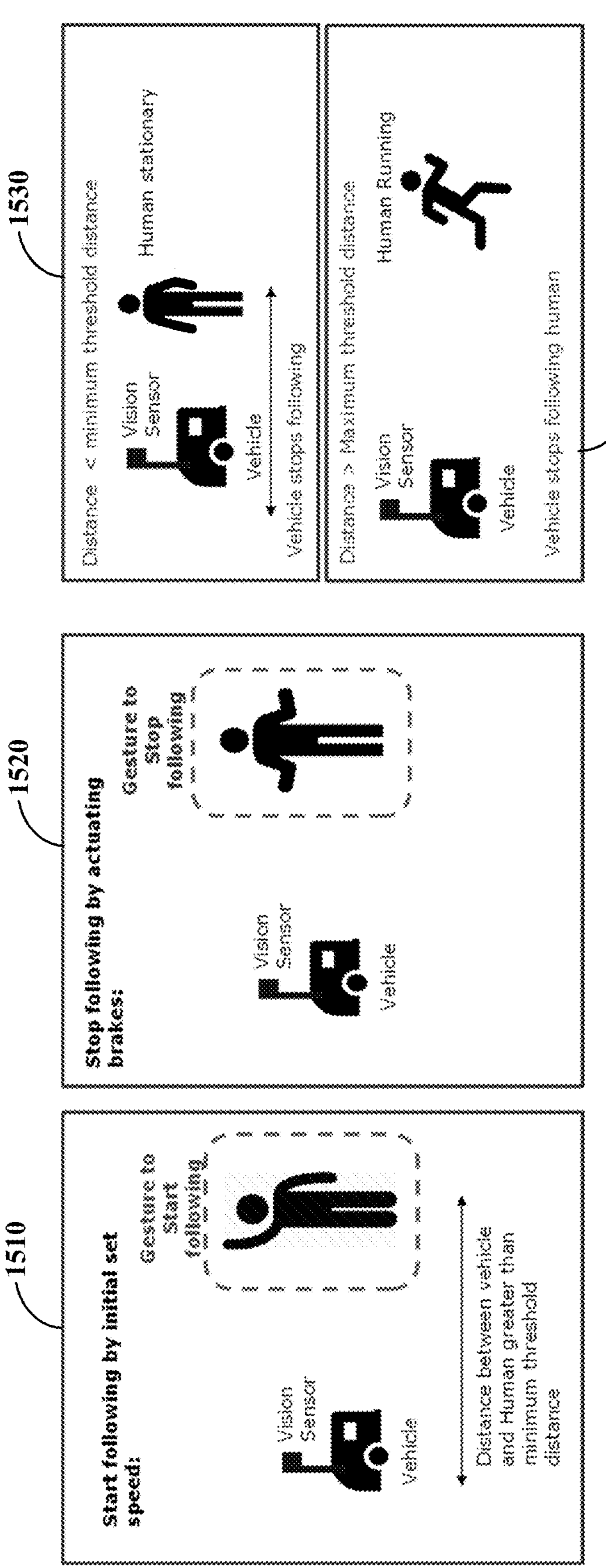
FIG. 15 shows illustrations of examples of gesture recognition for control of automated human following by a vehicle.

FIG. 15 shows illustrations of examples of gesture recognition for control of automated human following by a vehicle. In a first scenario 1510, a human performs a start following gesture to cause a vehicle to start following the human. In this example, the vehicle starts further than a minimum distance threshold from the human, so vehicle sets an initial speed to start following the human and closing the distance between them. In a second scenario 1520, a user performs a stop following gesture to cause a vehicle to stop following the human. In response, the vehicle then stops its current motion by actuating brakes. In a third scenario 1530, a human becomes stationary and, when the vehicle reaches the minimum distance threshold the vehicle stops moving to maintain its minimum distance from the human. In a fourth scenario 1540, a human runs away from the vehicle faster than the vehicle is configured to follow. When the distance between the vehicle and the human exceeds a maximum distance threshold, the vehicle automatically stops following the human.

FIG. 16 shows illustrations of examples of control of a vehicle for automated human following. In these examples an angle between a ray pointing to a human being followed and axis associated with a heading of a vehicle is detected and actuators (e.g., steering) are used to correct this angle. In a first scenario 1610, the human being followed is positioned along an axis corresponding to the heading of the vehicle, so the angle is approximately zero and the vehicle continues to move straight following the human. In a second scenario 1620, the human being followed is positioned off an axis corresponding to the heading of the vehicle. The vehicle detects the nonzero angle between a ray pointing to the human and the axis corresponding to the heading of the vehicle, and the vehicle continues to move straight following the human. Since the angle is substantially nonzero corrective action is needed to realign the vehicle's motion with the human. In a third scenario 1630, the vehicle plans and executes a smooth curve turn of the vehicle to realign its path with the human to continue following the human.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. A method comprising:

detecting a human in a first image captured using an image sensor connected to a vehicle;

inputting at least a portion of the first image to a first machine learning model to obtain a first pose of the human, wherein the first pose includes a position of a wrist, an elbow, a shoulder, a waist, a knee, an ankle, or a knuckle;

comparing the first pose to pose parameters for an authentication gesture, wherein a portion of the first pose is compared to the pose parameters for the authentication gesture using a distance metric for poses, wherein a pose includes positions of a set of human joints;

authenticating the human based on a match between the first pose and the authentication gesture to enable gesture commands from the human;

inputting at least a portion of a second image captured using the image sensor to the first machine learning model to obtain a second pose of the human;

comparing the second pose to pose parameters for a follow gesture;

commencing a follow mode based on a match between the second pose and the follow gesture occurring after authentication of the human; and controlling the vehicle to follow the human responsive to being in the follow mode.

2. The method of claim 1, comprising:

tracking the human in video captured using the image sensor after the authentication of the human.

3. The method of claim 2, comprising:

determining a distance of the human from the vehicle based on the video captured using the image sensor during the follow mode;

terminating the follow mode responsive to the distance of the human from the vehicle exceeding a threshold; and stopping the vehicle responsive to terminating the follow mode.

4. The method of claim 2, comprising:

determining a distance of the human from the vehicle based on the video captured using the image sensor during the follow mode;

terminating the follow mode responsive to the distance of the human from the vehicle reaching a minimum distance threshold; and stopping the vehicle responsive to terminating the follow mode.

5. The method of claim 1, comprising:

receiving a gesture configuration command;

responsive to the gesture configuration command, iteratively inputting at least portions of a sequence of images captured using the image sensor to the first machine learning model to obtain a set of poses and comparing the poses in the set of poses using a distance metric for poses until an average distance between poses in the set of poses is below a threshold;

determining a new set of pose parameters based on the set of poses; and storing the new set of pose parameters in a gesture record associated with a command for the vehicle.

6. The method of claim 1, in which detecting the human in the first image comprises:

inputting the first image to a deep neural network to obtain a bounding box for the human in the first image.

7. The method of claim 6, in which a portion of the first image specified by the bounding box is input to the first machine learning model to obtain the first pose.

8. A system comprising:

a vehicle;

an image sensor connected to the vehicle; and a processing apparatus configured to:

detect a human in a first image captured using the image sensor;

input at least a portion of the first image to a first machine learning model to obtain a first pose of the human, wherein the first pose includes a position of a wrist, an elbow, a shoulder, a waist, a knee, an ankle, or a knuckle;

compare the first pose to pose parameters for an authentication gesture, wherein a portion of the first pose is compared to the pose parameters for the authentication gesture using a distance metric for poses, wherein a pose includes positions of a set of human joints;

authenticate the human based on a match between the first pose and the authentication gesture to enable gesture commands from the human;

input at least a portion of a second image captured using the image sensor to the first machine learning model to obtain a second pose of the human;

compare the second pose to pose parameters for a follow gesture;

commence a follow mode based on a match between the second pose and the follow gesture occurring after authentication of the human; and control the vehicle to follow the human responsive to being in the follow mode.

9. The system of claim 8, in which the processing apparatus is configured to:

track the human in video captured using the image sensor after the authentication of the human.

10. The system of claim 9, in which the processing apparatus is configured to:

determine a distance of the human from the vehicle based on the video captured using the image sensor during the follow mode;

terminate the follow mode responsive to the distance of the human from the vehicle exceeding a threshold; and stop the vehicle responsive to terminating the follow mode.

11. The system of claim 8, in which the processing apparatus is configured to:

receive a gesture configuration command;

responsive to the gesture configuration command, iteratively input at least portions of a sequence of images captured using the image sensor to the first machine learning model to obtain a set of poses and compare the poses in the set of poses using a distance metric for poses until an average distance between poses in the set of poses is below a threshold;

determine a new set of pose parameters based on the set of poses; and store the new set of pose parameters in a gesture record associated with a command for the vehicle.

12. The system of claim 8, in which the processing apparatus is configured to:

input the first image to a deep neural network to obtain a bounding box for the human in the first image.

13. The system of claim 12, in which a portion of the first image specified by the bounding box is input to the first machine learning model to obtain the first pose.

14. The system of claim 8, comprising:

actuators configured to control motion of the vehicle; and in which the processing apparatus is configured to control, using one or more of the actuators, the vehicle to follow the human.

15. The system of claim 8, wherein the processing apparatus is attached to the vehicle.

16. A non-transitory computer-readable storage medium storing executable instructions that, when executed by a processor, facilitate performance of operations comprising:

detecting a human in a first image captured using an image sensor connected to a vehicle;

inputting at least a portion of the first image to a first machine learning model to obtain a first pose of the human, wherein the first pose includes a position of a wrist, an elbow, a shoulder, a waist, a knee, an ankle, or a knuckle;

comparing the first pose to pose parameters for an authentication gesture, wherein a portion of the first pose is compared to the pose parameters for the authentication gesture using a distance metric for poses, wherein a pose includes positions of a set of human joints;

authenticating the human based on a match between the first pose and the authentication gesture to enable gesture commands from the human;

inputting at least a portion of a second image captured using the image sensor to the first machine learning model to obtain a second pose of the human;

comparing the second pose to pose parameters for a follow gesture;

commencing a follow mode based on a match between the second pose and the follow gesture occurring after authentication of the human; and controlling the vehicle to follow the human responsive to being in the follow mode.

17. The non-transitory computer-readable storage medium of claim 16, in which the operations comprise:

tracking the human in video captured using the image sensor after the authentication of the human;

determining a distance of the human from the vehicle based on the video captured using the image sensor during the follow mode;

terminating the follow mode responsive to the distance of the human from the vehicle exceeding a threshold; and stopping the vehicle responsive to terminating the follow mode.

18. The non-transitory computer-readable storage medium of claim 16, in which the operations comprise:

receiving a gesture configuration command;

responsive to the gesture configuration command, iteratively inputting at least portions of a sequence of images captured using the image sensor to the first machine learning model to obtain a set of poses and comparing the poses in the set of poses using a distance metric for poses until an average distance between poses in the set of poses is below a threshold;

determining a new set of pose parameters based on the set of poses; and storing the new set of pose parameters in a gesture record associated with a command for the vehicle.

19. The non-transitory computer-readable storage medium of claim 16, in which the operations comprise:

inputting the first image to a deep neural network to obtain a bounding box for the human in the first image, in which a portion of the first image specified by the bounding box is input to the first machine learning model to obtain the first pose.

20. The non-transitory computer-readable storage medium of claim 16, in which the operations comprise:

tracking the human in video captured using the image sensor after the authentication of the human;

determining a distance of the human from the vehicle based on the video captured using the image sensor during the follow mode;

terminating the follow mode responsive to the distance of the human from the vehicle reaching a minimum distance threshold; and stopping the vehicle responsive to terminating the follow mode.

* * * * *